United States Patent
Frink et al.

(10) Patent No.: US 11,509,711 B2
(45) Date of Patent: *Nov. 22, 2022

(54) CUSTOMIZED MEMORY MODULES IN MULTI-TENANT PROVIDER SYSTEMS

(71) Applicant: Amazon Technologies, Inc., Seattle, WA (US)

(72) Inventors: Darin Lee Frink, Lake Tapps, WA (US); Brent Kenneth Clore, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,289

(22) Filed: Nov. 22, 2019

(65) Prior Publication Data

US 2020/0092357 A1    Mar. 19, 2020

Related U.S. Application Data

(63) Continuation of application No. 14/670,246, filed on Mar. 26, 2015, now Pat. No. 10,491,667.

(Continued)

(51) Int. Cl.
*G06F 9/455* (2018.01)
*G06F 9/50* (2006.01)
(Continued)

(52) U.S. Cl.
CPC ...... *H04L 67/1008* (2013.01); *G06F 9/45545* (2013.01); *G06F 9/5016* (2013.01);
(Continued)

(58) Field of Classification Search
CPC ....... G06F 3/0608; G06F 3/0628–0667; G06F 9/5016; G06F 9/44–548; G06F 9/45533; G06F 2009/45595; G06F 2009/5016
See application file for complete search history.

(56) References Cited

U.S. PATENT DOCUMENTS

| 4,161,036 A | 7/1979 | Morris et al. |
| 5,293,607 A | 3/1994 | Brockmann et al. |

(Continued)

OTHER PUBLICATIONS

Franceschelli, Davide, et al. "Space4cloud: A tool for system performance and costevaluation of cloud systems." Proceedings of the 2013 international workshop on Multi-cloud applications and federated clouds. 2013. (Year: 2013).*

*Primary Examiner* — Glenton B Burgess
*Assistant Examiner* — Julian Chang
(74) *Attorney, Agent, or Firm* — Robert C. Kowert; Kowert, Hood, Munyon, Rankin & Goetzel, P.C.

(57) ABSTRACT

A computing system providing virtual computing services may maintain a fleet of servers that host virtual machine instances having a wide variety of types and configurations. A service provider may rent processor and memory capacity by defining and offering various virtual machine instances to clients. Each virtual machine instance may include one or more virtual CPUs and a fixed amount of virtualized memory allocated to each virtual CPU, dependent on a predefined ratio between virtual CPU capacity and virtualized memory capacity for the instance type. Each server may include a custom, non-standard sized physical memory module containing memory devices of multiple technologies, types, or sizes on the same printed circuit board. By including custom memory modules, rather than relying only on standard memory modules, the service provider system may implement virtual machines having finer grained options for processor and memory capacity combinations, and may avoid stranding rentable resources.

20 Claims, 11 Drawing Sheets

Related U.S. Application Data

(60) Provisional application No. 62/133,927, filed on Mar. 16, 2015.

(51) Int. Cl.
*G06F 12/02* (2006.01)
*H04L 67/1008* (2022.01)
*H04L 67/1021* (2022.01)

(52) U.S. Cl.
CPC ........ *G06F 12/023* (2013.01); *H04L 67/1021* (2013.01); *G06F 2009/4557* (2013.01)

(56) References Cited

U.S. PATENT DOCUMENTS

| | | | | |
|---|---|---|---|---|
| 5,826,041 | A * | 10/1998 | Ogus | G06F 5/12 709/234 |
| 6,065,019 | A * | 5/2000 | Ault | G06F 9/5016 |
| 6,088,759 | A * | 7/2000 | Hasbun | G06F 9/5016 711/103 |
| 6,182,188 | B1 * | 1/2001 | Hasbun | G06F 12/0246 711/103 |
| 6,205,548 | B1 * | 3/2001 | Hasbun | G06F 12/0246 713/2 |
| 6,381,668 | B1 | 4/2002 | Lunteren | |
| 6,636,935 | B1 * | 10/2003 | Ware | G06F 13/1684 365/221 |
| 6,704,925 | B1 * | 3/2004 | Bugnion | G06F 9/45516 703/26 |
| 6,769,050 | B1 * | 7/2004 | Ware | G06F 13/1684 711/149 |
| 6,785,782 | B1 * | 8/2004 | Ware | G11C 5/04 365/189.02 |
| 6,807,106 | B2 * | 10/2004 | Gonzales | G11C 11/56 365/185.33 |
| 6,826,657 | B1 * | 11/2004 | Ware | G06F 13/1684 365/189.02 |
| 8,239,735 | B2 * | 8/2012 | Shalvi | G11C 11/5628 714/774 |
| 8,392,683 | B1 * | 3/2013 | Confalonieri | G06F 12/0246 711/163 |
| 8,836,960 | B1 * | 9/2014 | Montierth | G06F 3/1211 358/1.13 |
| 8,930,647 | B1 * | 1/2015 | Smith | G06F 30/392 711/154 |
| 9,201,639 | B2 | 12/2015 | Kumar et al. | |
| 9,471,585 | B1 * | 10/2016 | Theimer | G06F 3/0641 |
| 9,621,435 | B2 | 4/2017 | Vasudevan et al. | |
| 9,652,265 | B1 * | 5/2017 | Narayanasamy | G06F 9/45558 |
| 9,723,065 | B2 | 8/2017 | Thakkar et al. | |
| 9,858,181 | B2 * | 1/2018 | Uematsu | G06F 12/0638 |
| 10,171,370 | B1 * | 1/2019 | Berg | H04L 47/70 |
| 10,491,667 | B1 | 11/2019 | Frink et al. | |
| 10,902,014 | B1 * | 1/2021 | Adogla | G06F 9/45558 |
| 2002/0170019 | A1 * | 11/2002 | Hsu | G06F 30/30 716/102 |
| 2004/0108532 | A1 * | 6/2004 | Forbes | H01L 29/7841 257/296 |
| 2004/0225858 | A1 * | 11/2004 | Brueggen | G06F 12/0653 711/172 |
| 2006/0265470 | A1 * | 11/2006 | Rolia | G06F 9/5027 709/217 |
| 2007/0192466 | A1 * | 8/2007 | Nahum | G06F 9/4416 709/223 |
| 2008/0022282 | A1 * | 1/2008 | Cherkasova | G06F 11/3461 718/102 |
| 2008/0022284 | A1 * | 1/2008 | Cherkasova | G06F 9/4881 718/104 |
| 2008/0022285 | A1 * | 1/2008 | Cherkasova | G06F 9/505 718/104 |
| 2008/0028409 | A1 * | 1/2008 | Cherkasova | G06F 9/5061 718/104 |
| 2008/0271038 | A1 * | 10/2008 | Rolia | G06F 9/505 718/105 |
| 2009/0113422 | A1 | 4/2009 | Kani | |
| 2009/0138887 | A1 | 5/2009 | Keitaro et al. | |
| 2009/0172336 | A1 * | 7/2009 | Schmidt | G06F 9/5016 711/170 |
| 2009/0187798 | A1 | 7/2009 | Kim | |
| 2010/0142243 | A1 * | 6/2010 | Baxter | G11C 5/02 365/51 |
| 2010/0174876 | A1 * | 7/2010 | Kasahara | G06F 12/0284 711/154 |
| 2010/0262751 | A1 | 10/2010 | Avudaiyappan | |
| 2010/0306494 | A1 * | 12/2010 | DeVilbiss | G06F 9/5016 711/170 |
| 2011/0246742 | A1 * | 10/2011 | Kogen | G06F 12/023 711/170 |
| 2012/0136871 | A1 * | 5/2012 | Soulard | G06F 9/445 707/741 |
| 2012/0144008 | A1 * | 6/2012 | Yuyitung | G06F 9/5066 709/223 |
| 2012/0159523 | A1 | 6/2012 | Kulkarni et al. | |
| 2012/0300555 | A1 * | 11/2012 | Shin | G11C 7/10 365/189.03 |
| 2012/0304169 | A1 | 11/2012 | Anderson et al. | |
| 2013/0061017 | A1 * | 3/2013 | He | G06F 12/023 711/165 |
| 2013/0139152 | A1 * | 5/2013 | Chang | G06F 9/45558 718/1 |
| 2013/0227196 | A1 * | 8/2013 | Zheng | G06F 3/00 711/103 |
| 2013/0318526 | A1 * | 11/2013 | Conrad | G06F 9/45533 718/1 |
| 2013/0346493 | A1 | 12/2013 | Martin | |
| 2014/0040576 | A1 * | 2/2014 | Cordero | G06F 3/0629 711/162 |
| 2014/0052895 | A1 * | 2/2014 | Dai | G06F 3/0625 711/103 |
| 2014/0052900 | A1 * | 2/2014 | Dai | G06F 1/32 711/103 |
| 2014/0068600 | A1 | 3/2014 | Ashok et al. | |
| 2014/0068602 | A1 * | 3/2014 | Gember | H04L 12/4633 718/1 |
| 2014/0075032 | A1 | 3/2014 | Vasudevan et al. | |
| 2014/0075033 | A1 | 3/2014 | Doering et al. | |
| 2014/0075412 | A1 | 3/2014 | Kannan et al. | |
| 2014/0082202 | A1 * | 3/2014 | Zhao | G06F 9/45558 709/226 |
| 2014/0082612 | A1 | 3/2014 | Breitgand et al. | |
| 2014/0164690 | A1 * | 6/2014 | De | G06F 12/0638 711/105 |
| 2014/0188807 | A1 * | 7/2014 | Al-Kiswany | G06F 3/0613 707/652 |
| 2014/0196032 | A1 | 7/2014 | Gupta | |
| 2014/0207425 | A1 | 7/2014 | Yeung et al. | |
| 2014/0215176 | A1 * | 7/2014 | Iga | G06F 9/5016 711/170 |
| 2014/0250286 | A1 | 9/2014 | Nobukazu et al. | |
| 2014/0280595 | A1 | 9/2014 | Mani et al. | |
| 2014/0282591 | A1 | 9/2014 | Stich et al. | |
| 2014/0282889 | A1 | 9/2014 | Ishaya et al. | |
| 2014/0373007 | A1 | 12/2014 | Sean et al. | |
| 2015/0033002 | A1 * | 1/2015 | Cordero | G06F 9/45558 713/1 |
| 2015/0058486 | A1 * | 2/2015 | Huang | G06F 9/4856 709/226 |
| 2015/0120928 | A1 | 4/2015 | Gummaraju et al. | |
| 2015/0125832 | A1 * | 5/2015 | Tran | G09B 19/0092 434/127 |
| 2015/0128135 | A1 | 5/2015 | Cao et al. | |
| 2015/0143037 | A1 * | 5/2015 | Smith | G06F 3/0659 711/103 |
| 2015/0177987 | A1 * | 6/2015 | Lim | G06F 12/0802 711/118 |
| 2015/0199197 | A1 | 7/2015 | Maes et al. | |
| 2015/0255130 | A1 * | 9/2015 | Lee | H04L 67/1097 711/103 |

(56) References Cited

U.S. PATENT DOCUMENTS

| | | | |
|---|---|---|---|
| 2015/0261446 A1* | 9/2015 | Lee | G06F 13/385 711/103 |
| 2015/0262633 A1* | 9/2015 | Lee | G11C 7/1075 710/308 |
| 2015/0277944 A1* | 10/2015 | Wang | G06F 9/45558 718/1 |
| 2015/0317093 A1* | 11/2015 | Okada | G06F 3/0659 711/119 |
| 2015/0347194 A1 | 12/2015 | Che et al. | |
| 2016/0043968 A1 | 2/2016 | Jacob et al. | |
| 2016/0080484 A1* | 3/2016 | Earl | G06F 9/5027 709/226 |
| 2016/0098297 A1* | 4/2016 | Yuyitung | G06F 11/3447 718/104 |
| 2016/0103712 A1 | 4/2016 | Thakkar et al. | |
| 2016/0105488 A1 | 4/2016 | Thakkar et al. | |
| 2016/0162308 A1* | 6/2016 | Chen | G06F 9/45533 718/1 |
| 2016/0164738 A1 | 6/2016 | Pinski et al. | |
| 2016/0212064 A1 | 7/2016 | Biswas et al. | |
| 2016/0269313 A1 | 9/2016 | Brooker et al. | |
| 2017/0046189 A1* | 2/2017 | Zou | G06F 9/5077 |
| 2017/0132042 A1 | 5/2017 | Cherkasova | |

* cited by examiner

CUSTOMIZED MEMORY MODULES IN MULTI-TENANT PROVIDER SYSTEMS

This application is a continuation of U.S. patent application Ser. No. 14/670,246, filed Mar. 26, 2015, which claims benefit of priority to U.S. Provisional Application Ser. No. 62/133,927, filed Mar. 16, 2015, which are incorporated herein by reference in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis. In some systems, virtualized computing resources can be used to implement virtual desktops.

Some web-based services provide compute capacity in the cloud. In some cases, service customers or subscribers can (e.g., through a lease agreement) obtain access to virtual resources that run in the service provider's computing environment and can configure them for their own use. For example, customers or subscribers can rent virtual processor capacity and virtualized memory capacity for running their applications on service provider resources.

Figure 1:
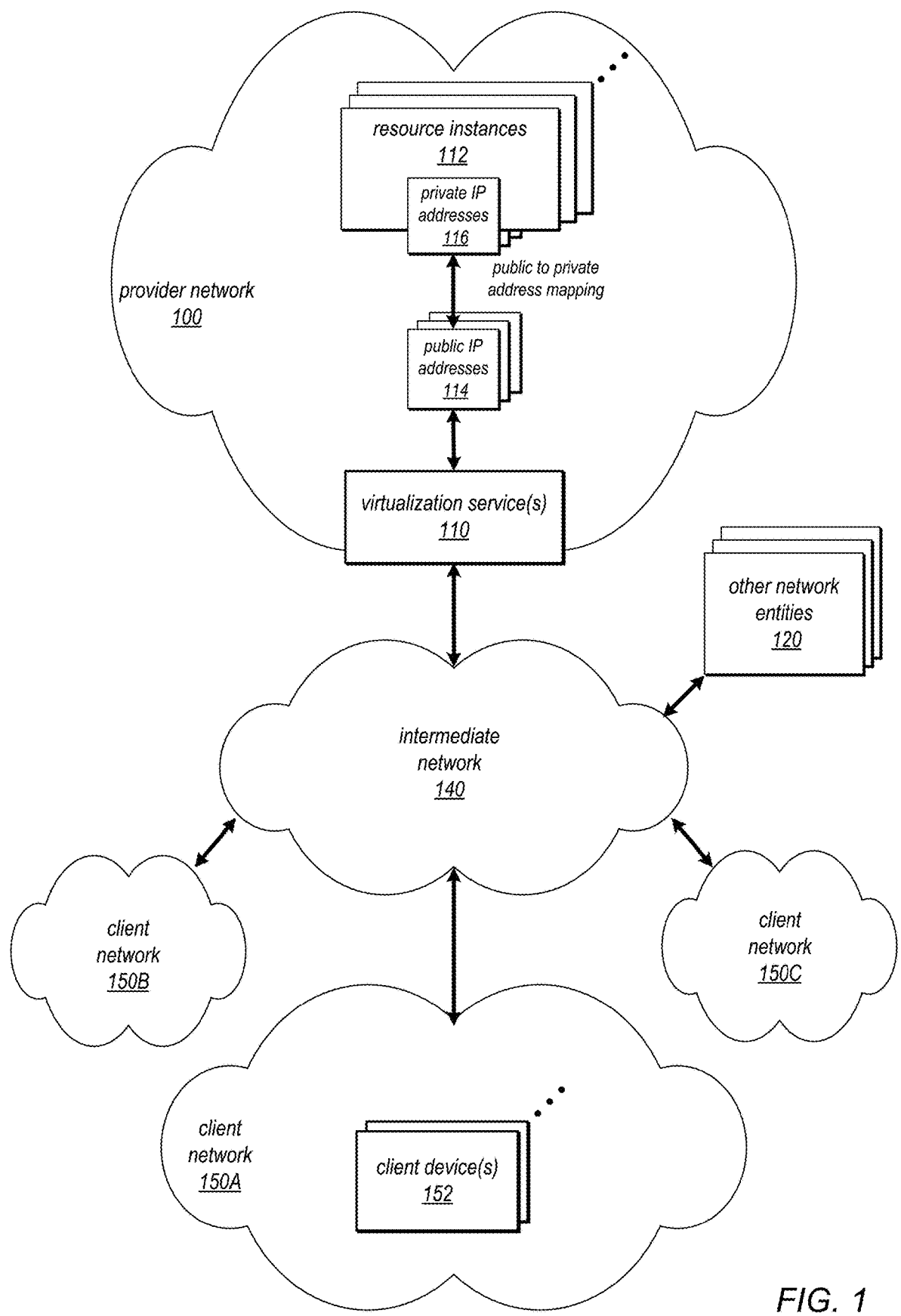
FIG. 1 is a block diagram illustrating an example provider network environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

In order to avoid stranding what would otherwise be rentable resources, the service provider systems described herein (e.g., service provider systems that provide virtual computing resource instances to customers and/or subscribers) may maintain a fleet of servers that collectively host virtual computing resource instances having a wide variety of types and configurations. These servers, each of which may include one or more custom, non-standard sized physical memory modules (e.g., memory modules that contain memory devices of two or more different technologies, types, and/or sizes on the same printed circuit board), may host virtual machine instances that provide different combinations of processing capacity (e.g., different numbers of virtual CPUs implemented by different types of physical processor devices) and virtualized memory capacity with finer granularity and a better fit to supported ratios between virtual CPUs and virtualized memory capacity than is currently available using only standard-sized memory modules. For example, the service provider may rent processor and memory capacity by defining and offering rentable virtual machines. Each virtual machine may include one or more virtual CPUs and a fixed amount of virtualized memory that is allocated to each virtual CPU. The fixed amount of virtualized memory that is allocated to each virtual CPU may be predefined for each virtual computing resource instance type (or family of instance types) in terms of a ratio between virtual CPU capacity and virtualized memory capacity.

In some embodiments, the service provider's networked environment may include multiple servers, each of which is hosted on a respective one of multiple computing nodes that collectively provide virtual computing services. These computing nodes may be located within data centers in multiple availability zones (e.g., in different buildings, cities, countries, or regions), in different embodiments.

In some embodiments, in response to a client request for a virtual computing resource instance, the service may be configured to provision a virtual computing resource instance of a specified type and configuration for the use of the client or to assign to the client a previously provisioned virtual computing resource instance of the specified type and configuration. In some embodiments, this virtual computing resource instance may be one of multiple virtual resource instances that operate (or participate) within a virtual private cloud of the client on whose behalf they were instantiated and/or configured (e.g., a client on whose behalf the request was received from a client device).

Figure 8:
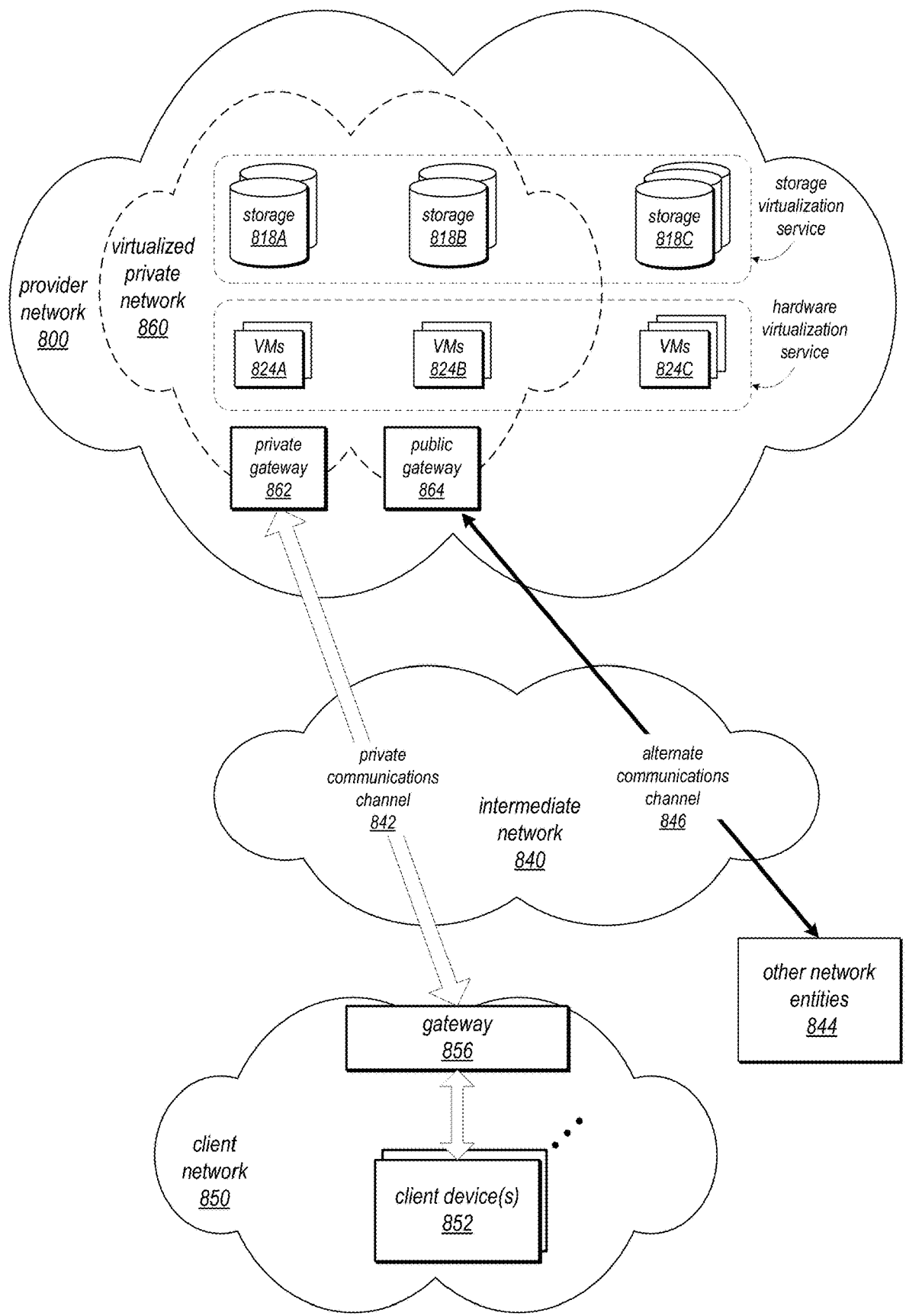
FIG. 8 is a block diagram illustrating an example provider network that provides private networks to clients, according to at least some embodiments.
Figure 9:
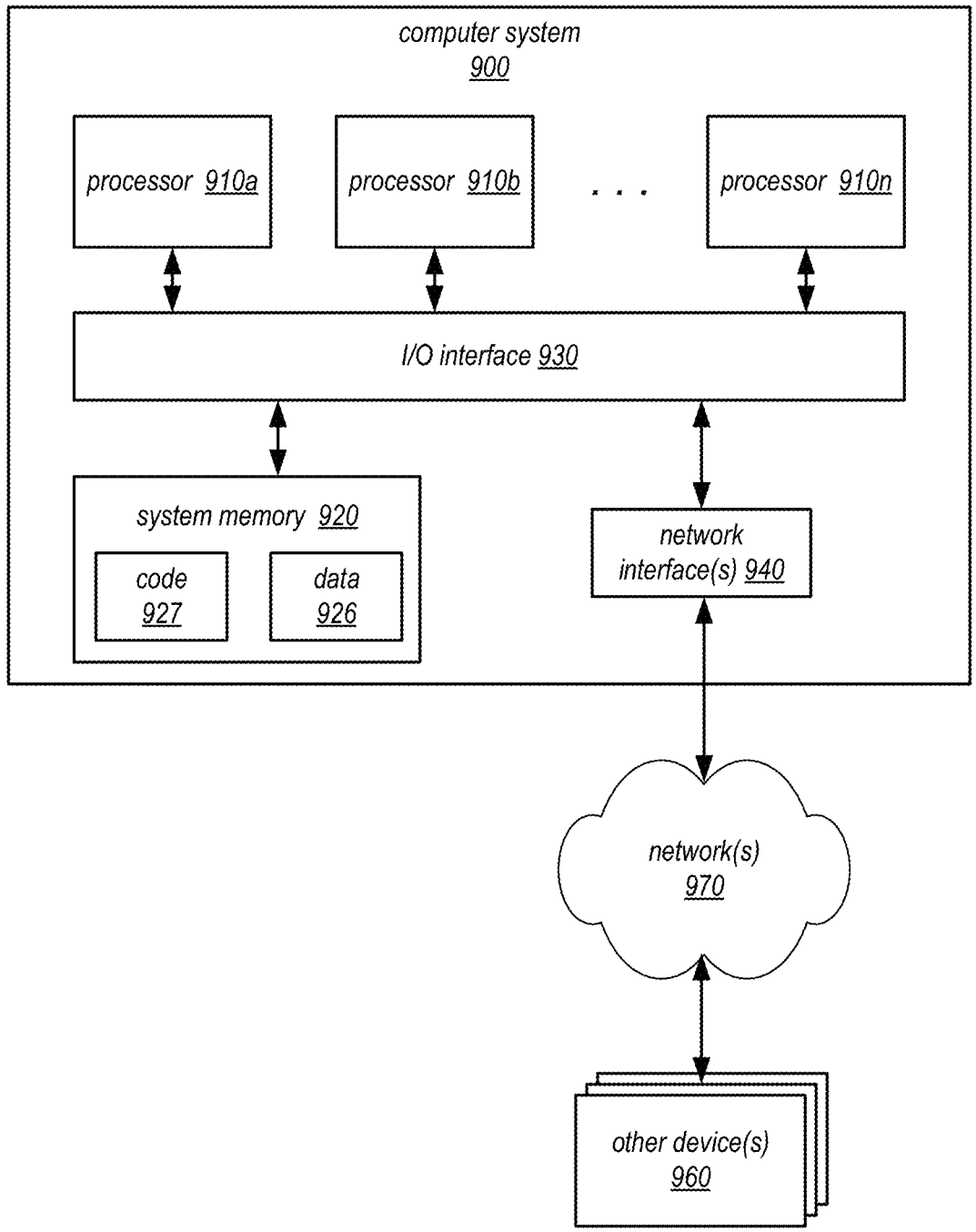
FIG. 9 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques for providing virtual computing resource instances using physical resources that may include custom, non-standard sized memory modules described herein may be implemented is illustrated in FIG. 9. Embodiments of various systems and methods for implementing these techniques are generally described herein in the context of a service provider that provides to clients, via an intermediate network such as the Internet, virtualized resources (e.g., virtualized computing and storage resources) implemented on a provider network of the service provider. FIGS. 1-3 and 8-9 (and the corresponding descriptions thereof) illustrate and describe example environments in which embodiments of the systems and methods described herein may be implemented, and are not intended to be limiting. In at least some embodiments, at least some of the resources provided to clients of the service provider via the provider network may be virtualized computing resources implemented on multitenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via APIs to the services to obtain and configure resource instances and to establish and manage virtual network configurations that include the resource instances, for example virtualized private networks.

Figure 3:
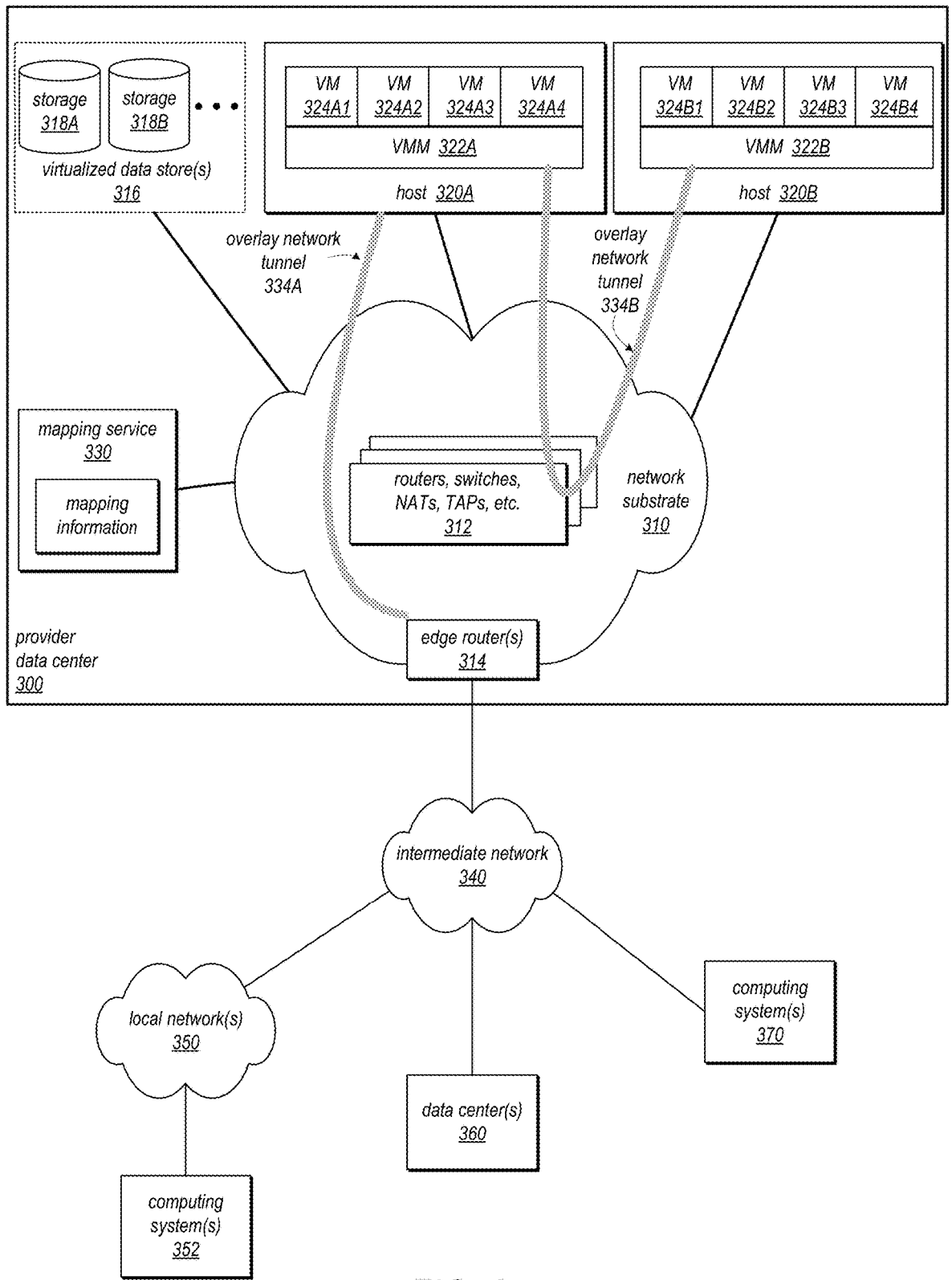
FIG. 3 is a block diagram illustrating an example service provider data center, according to at least some embodiments.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host. An example of a system that employs such a hardware virtualization technology is illustrated in FIG. 3 and described in detail below.

Note that, in various embodiments, the systems described herein for providing virtual computing services may be deployed across multiple "availability zones", each of which may include its own physically distinct, independent infrastructure on which a collection of computing nodes are implemented. In some embodiments, each availability zone may reside in a different geographic location or region, while in other embodiments multiple availability zones may reside in the same geographic location or region.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be access by end users. For example, end users who are associated with the customer on whose behalf the virtualized resource instances are hosted (e.g., members of the same organization or enterprise) may be able to access the virtualized resource instances using client applications on client devices. In some embodiments, the virtualized resource instances may be configured to implement virtual desktop instances.

FIG. 1 illustrates an example provider network environment, according to at least some embodiments. A provider network 100 may provide resource virtualization to clients via one or more virtualization services 110 that allow clients to purchase, rent, or otherwise obtain instances 112 of virtualized resources, including but not limited to computation and storage resources, implemented on devices within the provider network or networks in one or more data centers. Private IP addresses 116 may be associated with the resource instances 112; the private IP addresses are the internal network addresses of the resource instances 112 on the provider network 100. In some embodiments, the provider network 100 may also provide public IP addresses 114 and/or public IP address ranges (e.g., Internet Protocol version 4 (IPv4) or Internet Protocol version 6 (IPv6) addresses) that clients may obtain from the provider 100.

Conventionally, the provider network 100, via the virtualization services 110, may allow a client of the service provider (e.g., a client that operates client network 150A, 150B, or 150C, each of which may include one or more client devices 152) to dynamically associate at least some public IP addresses 114 assigned or allocated to the client with particular resource instances 112 assigned to the client. The provider network 100 may also allow the client to remap a public IP address 114, previously mapped to one virtualized computing resource instance 112 allocated to the client, to another virtualized computing resource instance 112 that is also allocated to the client. For example, using the virtualized computing resource instances 112 and public IP addresses 114 provided by the service provider, a client of the service provider such as the operator of client network 150A may implement client-specific applications and present the client's applications on an intermediate network 140, such as the Internet. Other network entities 120 on the intermediate network 140 may then generate traffic to a destination public IP address 114 published by the client network 150A; the traffic is routed to the service provider data center, and at the data center is routed, via a network substrate, to the private IP address 116 of the virtualized computing resource instance 112 currently mapped to the destination public IP address 114. Similarly, response traffic from the virtualized computing resource instance 112 may be routed via the network substrate back onto the intermediate network 140 to the source entity 120.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 100; a client may then assign their allocated public IP addresses to particular resource instances allocated to the client. These public IP addresses may be referred to as client public IP addresses, or simply client IP addresses. Instead of being assigned by the provider network 100 to resource instances as in the case of standard IP addresses, client IP addresses may be assigned to resource instances by the clients, for example via an API provided by the service provider. Unlike standard IP addresses, client IP addresses may be allocated to client accounts and remapped to other resource instances by the respective clients as necessary or desired. In some embodiments, a client IP address is associated with a client's account, not a particular resource instance, and the client controls that IP address until the client chooses to release it. Unlike conventional static IP addresses, client IP addresses may allow the client to mask resource instance or availability zone failures by remapping the client's public IP addresses to any resource instance associated with the client's account. The client IP addresses, for example, may enable a client to engineer around problems with the client's resource instances or software by remapping client IP addresses to replacement resource instances.

Note also that in some embodiments, the resource instances 112 that are made available to clients (e.g., client devices 152) via virtualization service(s) 110 may include multiple network interfaces. For example, at least some of them virtualized computing resource instances (including some that are configured to implement virtual desktop instances) may include one network interface for communicating with various components of a client network 150 and another network interface for communicating with resources or other network entities on another network that is external to provider network 100 (not shown).

Figure 2:
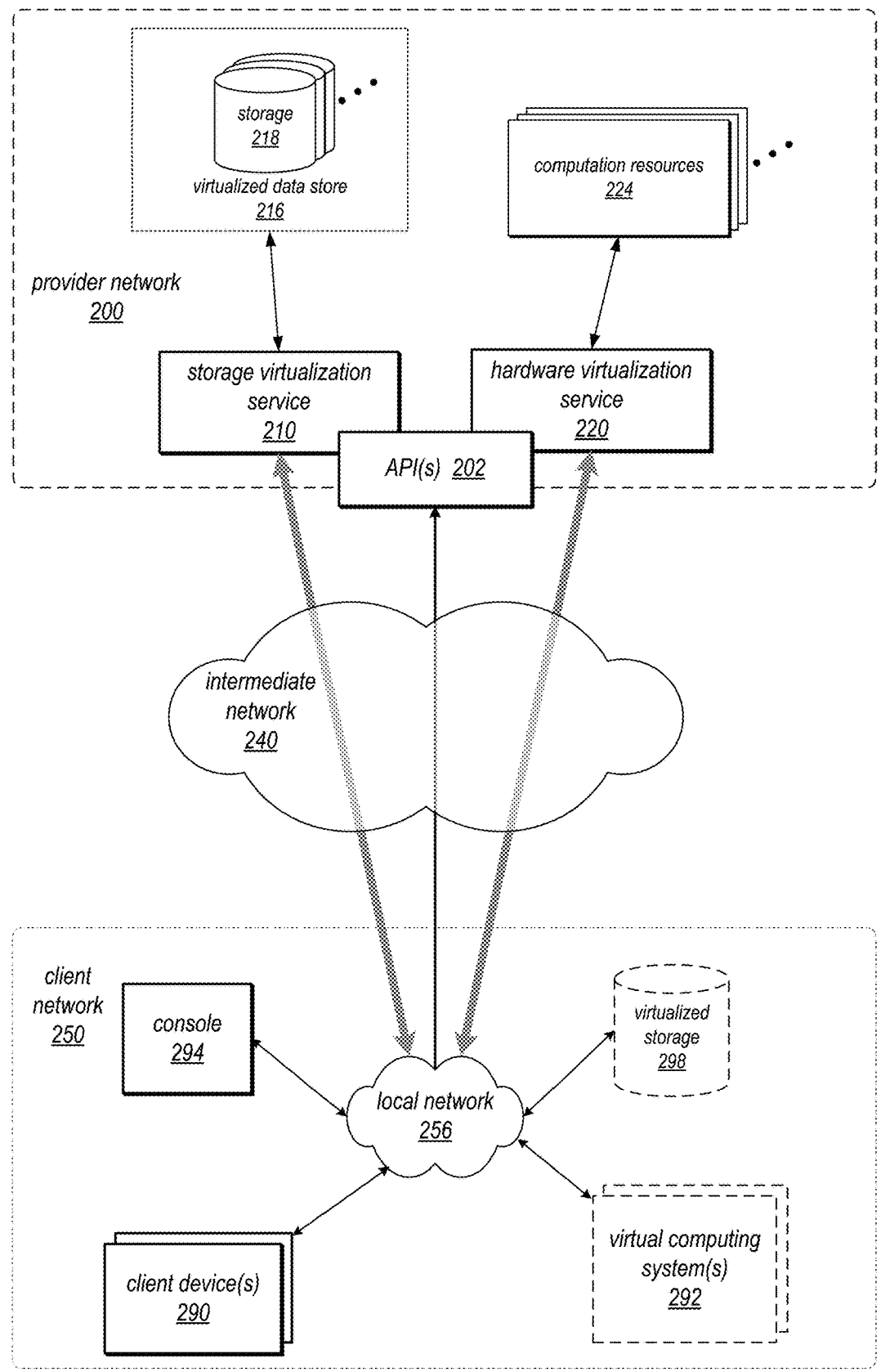
FIG. 2 is a block diagram illustrating an example provider network that provides a storage virtualization service and a hardware virtualization service to clients, according to at least some embodiments.

FIG. 2 is a block diagram of another example provider network environment, one that provides a storage virtualization service and a hardware virtualization service to clients, according to at least some embodiments. In this example, hardware virtualization service 220 provides multiple computation resources 224 (e.g., VMs) to clients. The computation resources 224 may, for example, be rented or leased to clients of the provider network 200 (e.g., to a client that implements client network 250). Each computation resource 224 may be provided with one or more private IP addresses. Provider network 200 may be configured to route packets from the private IP addresses of the computation resources 224 to public Internet destinations, and from public Internet sources to the computation resources 224.

Provider network 200 may provide a client network 250, for example coupled to intermediate network 240 via local network 256, the ability to implement virtual computing systems 292 via hardware virtualization service 220 coupled to intermediate network 240 and to provider network 200. In some embodiments, hardware virtualization service 220 may provide one or more APIs 202, for example a web services interface, via which a client network 250 may access functionality provided by the hardware virtualization service 220, for example via a console 294. In at least some embodiments, at the provider network 200, each virtual computing system 292 at client network 250 may correspond to a computation resource 224 that is leased, rented, or otherwise provided to client network 250.

From an instance of a virtual computing system 292 and/or another client device 290 or console 294, the client may access the functionality of storage virtualization service 210, for example via one or more APIs 202, to access data from and store data to a virtual data store 216 provided by the provider network 200. In some embodiments, a virtualized data store gateway (not shown) may be provided at the client network 250 that may locally cache at least some data, for example frequently accessed or critical data, and that may communicate with virtualized data store service 210 via one or more communications channels to upload new or modified data from a local cache so that the primary store of data (virtualized data store 216) is maintained. In at least some embodiments, a user, via a virtual computing system 292 and/or on another client device 290, may mount and access one or more storage volumes 218 of virtual data store 216, each of which appears to the user as local virtualized storage 298.

While not shown in FIG. 2, the virtualization service(s) may also be accessed from resource instances within the provider network 200 via API(s) 202. For example, a client, appliance service provider, or other entity may access a virtualization service from within a respective private network on the provider network 200 via an API 202 to request allocation of one or more resource instances within the private network or within another private network. Note that in some embodiments, the hardware virtualization service 220 may be configured to provide computation resources 224 that have been configured to implement a virtual desktop instance, which may appear to the user as a local desktop (implemented by a virtual computing system 292). Note also that in some embodiments, the computation resources 224 that are made available to the client via hardware virtualization service 220 may include multiple network interfaces. For example, at least some of them may include one network interface for communicating with various components of client network 250 and another network interface for communicating with computation resources or other network entities on another network that is external to provider network 200 (not shown).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are. An example use of overlay network technology is illustrated in FIG. 3 and described in detail below.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

FIG. 3 illustrates an example data center (e.g., one that implements an overlay network on a network substrate using IP tunneling technology), according to at least some embodiments. As illustrated in this example, a provider data center 300 may include a network substrate that includes networking devices 312 such as routers, switches, network address translators (NATs), and so on. At least some embodiments may employ an Internet Protocol (IP) tunneling technology to provide an overlay network via which encapsulated packets may be passed through network substrate 310 using tunnels. The IP tunneling technology may provide a mapping and encapsulating system for creating an overlay network on a network (e.g., a local network in data center 300 of FIG. 3) and may provide a separate namespace for the overlay layer (the public IP addresses) and the network substrate 310 layer (the private IP addresses). Packets in the overlay layer may be checked against a mapping directory (e.g., provided by mapping service 330) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 330) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 3, an example overlay network tunnel 334A from a virtual machine (VM) 324A on host 320A to a device on the intermediate network 340 (e.g., a computing system 370, a computing system 352 on local network 350, or a data center 360), and an example overlay network tunnel 334B between a VM 324B on host 320B and a VM 324A on host 320A are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

At least some networks in which embodiments of the techniques described herein for providing virtual computing resource instances in a cloud computing environment may be implemented may include hardware virtualization technology that enables multiple operating systems to run concurrently on a host computer (e.g., hosts 320A and 320B of FIG. 3), i.e. as virtual machines (VMs) 324 on the hosts 320. The VMs 324 may, for example, be rented or leased to clients of a network provider. A hypervisor, or virtual machine monitor (VMM) 322, on a host 320 may serve as an instance manager for the VMs 324 and/or other virtualized resource instances on the hosts 320, which may include presenting the VMs 324 on the host with a virtual platform and monitoring the execution of the VMs 324. Each VM 324 may be provided with one or more private IP addresses; the VMM 322 on a host 320 may be aware of the private IP addresses of the VMs 324 on the host. A mapping service 330 may be aware of all network IP prefixes and the IP addresses of routers or other devices serving IP addresses on the local network. This includes the IP addresses of the VMMs 322 serving multiple VMs 324. The mapping service 330 may be centralized, for example on a server system, or alternatively may be distributed among two or more server systems or other devices on the network. A network may, for example, use the mapping service technology and IP tunneling technology to, for example, route data packets between VMs 324 on different hosts 320 within the data center 300 network; note that an interior gateway protocol (IGP) may be used to exchange routing information within such a local network.

In addition, a network such as the provider data center 300 network (which is sometimes referred to as an autonomous system (AS)) may use the mapping service technology, IP tunneling technology, and routing service technology to route packets from the VMs 324 to Internet destinations, and from Internet sources to the VMs 324. Note that an external gateway protocol (EGP) or border gateway protocol (BGP) is typically used for Internet routing between sources and destinations on the Internet. FIG. 3 shows an example provider data center 300 implementing a network that provides resource virtualization technology and that provides full Internet access via edge router(s) 314 that connect to Internet transit providers, according to at least some embodiments. The provider data center 300 may, for example, provide clients the ability to implement virtual computing systems (VMs 324) via a hardware virtualization service (such as hardware virtualization service 220 in FIG. 2) and the ability to implement virtualized data stores 316 on storage resources 318 via a storage virtualization service (such as storage virtualization service 210 in FIG. 2).

In some embodiments, the data center 300 network may implement IP tunneling technology, mapping service technology, and a routing service technology to route traffic to and from virtualized resources, for example to route packets from the VMs 324 on hosts 320 in data center 300 to Internet destinations, and from Internet sources to the VMs 324. Internet sources and destinations may, for example, include computing systems 370 connected to the intermediate network 340 and computing systems 352 connected to local networks 350 that connect to the intermediate network 340 (e.g., via edge router(s) 314 that connect the network 350 to Internet transit providers). The provider data center 300 network may also route packets between resources in data center 300, for example from a VM 324 on a host 320 in data center 300 to other VMs 324 on the same host or on other hosts 320 in data center 300. In some embodiments, at least some of the VMs 324 may include two or more network interfaces. For example, they may include one network interface usable for communications between VMs 324 and the clients on whose behalf VMs 324 are hosted by the provider and a second (separate and distinct) network interface that is usable to access external resources, computing systems, data centers, or Internet destinations on networks other than the provider network and the client network, either or both of which may employ an IP tunneling technology, as described herein.

A service provider that provides data center 300 may also provide additional data center(s) 360 that include hardware virtualization technology similar to data center 300 and that may also be connected to intermediate network 340. Packets may be forwarded from data center 300 to other data centers 360, for example from a VM 324 on a host 320 in data center 300 to another VM on another host in another, similar data center 360, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 318, as virtualized resources to clients of a network provider in a similar manner.

Note that a public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network, or between a provider network and other network entities (e.g., external resources, computing systems, data centers, or Internet destinations on networks other than the provider network and the client network on whose behalf VMs 324 are hosted by the provider).

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, a customer may have an application running on a local machine, but may provision resource instances in a cloud computing environment to be used in case of a failure on the local machine. In some embodiments, multiple resource instances may be executing in a cloud computing environment to implement a distributed application on behalf of a client. In different embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients.

As noted above, in some embodiments, in order to avoid stranding what would otherwise be rentable resources, the service provider systems described herein may maintain a fleet of servers that collectively host virtual computing resource instances having a variety of configurations with finer granularity and a better fit to supported ratios between virtual CPUs and virtualized memory capacity than is currently available using standard-sized memory modules. For example, the service provider may rent processor and memory capacity by defining and offering rentable virtual machines. Each virtual machine may include one or more virtual CPUs and a fixed amount of virtualized memory that is allocated to each virtual CPU. The fixed amount of virtualized memory that is allocated to each virtual CPU may be predefined for each virtual computing resource instance type (or family of instance types) in terms of a ratio between virtual CPU capacity and virtualized memory capacity. For example, for virtual computing resource instances (virtual machines) in a family of instances of a first type, the service provider may allocate 2 gigabytes (GB) of memory to each virtual CPU; for virtual computing resource instances (virtual machines) in a family of instances of a second type, the service provider may allocate 4 GB of memory to each virtual CPU; and for virtual computing resource instances (virtual machines) in a family of instances of a third type, the service provider may allocate 8 GB of memory to each virtual CPU.

Note that, in various embodiments, there may be different numbers of virtual computing instance types and any number of different configurations of instances within a family of virtual computing instances of a particular type. For example, different virtual computing resource instances of the first type described above may be implemented using different underlying physical processors, may include different numbers of the available virtual CPUs of the underlying physical processors, may operate at different clock speeds, may have different network performance profiles, may have access to different amounts and/or types of storage resources, or may differ from each other in other ways.

As previously noted, a virtual computing services provider may wish to use all the physical resources they buy to implement rentable virtualized resources (i.e., to monetize, as much as possible, their physical resources) rather than to strand any of those resources (or significant portions thereof). In some embodiments, the systems described herein may include servers (and configurations thereof) in which the maximum amount of the physical resources are used to implement rentable virtual computing resource instances (e.g., VMs).

One element of a processor configuration is the number of cores that can be packed into a given power envelope (i.e., that has a certain frequency characteristic). For each given family or generation of processors, there may be multiple configurations of processors, each with a respective (and sometimes different) number of processor cores. Some of the processor cores may provide multiple hardware execution contexts through hyperthreading. For example, one processor may include twelve processor cores, and (through hyperthreading that turns each physical processor core into two virtual processors, or two hyperthreads) may implement 24 rentable virtual CPUs. When used to implement virtual machine instances in the first instance family described above, each server including such a processor would (ideally) be allocated 48 GB of memory (e.g., 2 GB per virtual CPU) for the use of instances that include one of the virtual CPUs of the processor, thus allowing all of the processor cores, threads (virtual CPUs) and memory to be rentable. In some embodiments, it may be desirable to populate all of the memory channels of each processor (e.g., for maximum memory performance for a given configuration). In this example, the processor includes four memory channels. Therefore, it may be desirable to populate each channel of the processor with 12 GB of memory.

Physical memory modules (such as dual in-line memory modules, or "DIMMs") are typically available only in configurations in which the number of bytes of memory corresponds to a power of two. For example, in the industry today, standard DIMMs are available in standard de facto capacities of 4, 8, 16, or 32 GB per DIMM. These modules may provide 3.75, 7.5, 15.25, or 30.5 gibibytes (GiB) of virtualized memory, respectively, where the prefix "gibi" represents multiplication by 1024 (i.e., one gibibyte=$2^{30}$ bytes). Note that the physical memory modules described herein are often referred to as containing a particular number of GB ($10^9$ bytes) of memory, and the virtual computing resource instances may be described as having a particular number of GB of memory or a corresponding number of GiB of memory (where each GiB is approximately equal to 1.07374 GB).

In the example described above, in order to populate a memory channel with 12 GB of memory using standard DIMMs, a service provider may populate the memory channel with a 16 GB memory module (thus paying for more memory capacity than is needed and stranding 4 GB of memory resources that cannot be rented to service customers/subscribers), or may populate the memory channel with an 8 GB memory module plus a 4 GB memory module. While the latter option provides the optimal amount of memory for a virtual machine instance of the third instance type described above, this may not be a particularly cost-effective solution. For example, 4 GB memory modules may be lower in volume (and thus higher in cost per GB) than 16 GB memory modules. Therefore, pairing the two standard memory modules may cost as much as (if not more than) a 16 GB module. In other words, neither of these options is ideal from the standpoint of the cost to the service provider, since one option results in stranding memory and the other results in paying a premium not to strand any memory.

In another example, a server containing two CPUs and hosting virtual machine instances of the first instance type described above, each CPU having 12 rentable cores, only requires 96 GB of memory (e.g., 12 cores×2 GB per virtual CPU×2 threads×2 CPUs=96 GB per server) to support virtual machine instances of the first instance type. However, using only standard (currently available) DIMMs, the service provider may be forced to use 128 GB of memory (e.g., one 16 GB DIMM per channel×8 channels=128 GB per server) to implement the memory for these virtual machine instances, stranding 32 GB of memory that is not available for rent to customers/subscribers. In this example, a 12 GB DRAM module would be an ideal fit for this server configuration (e.g., one 12 GB DIMM per channel×8 channels=96 GB), but 12 GB modules may not available in the market. In some embodiments, the systems described herein may employ customized memory modules of non-standard sizes and/or configurations in order to implement a fleet of virtual computing resource instances that more closely meet the requirements of a variety of instance types without stranding significant amounts of memory capacity.

Tables 1-3 below illustrate examples of the current limitations of standard DIMMs in matching the memory-to-processor ratio requirements of the three types of virtual computing resource instances described above. As shown in these tables, service providers typically strand significant portions of the standard physical memory modules that are used to build servers hosting virtual computing resource instances of these types on behalf of service customers/subscribers.

As illustrated in these tables, depending on how a service provider defines the virtual computing resource instance types and the various combinations of processor and memory capacities that are offered to service customers/subscribers, the offered instances may or may not match up to the physical resources available to the service provider (e.g., the numbers and configurations of processor cores and standard memory module sizes). In addition, there may be no guarantee that each new generation of processors will include enough cores to match up to the memory capacities that will be made available in the next generation of standard memory modules, since the roadmaps for these technologies are largely decoupled from each other. In some embodiments, the systems and techniques described herein may be used to provide a finer granularity for the types and configurations of virtual computing resource instances that the service provider can offer, e.g., in terms of memory capacity.

Note that, in general, standard DIMMs are built with DRAM devices, which are available with certain de facto standard capacities (e.g., 2 Gbit, 4 Gbit, 8 Gbit, 16 Gbit capacities, etc., following a pattern involving powers of 2). In addition, each DRAM device has a certain width (e.g., a certain number of data bits corresponding to the width of the memory interface on which it sits and through which the memory can be accessed). For example, some common

TABLE 1

Memory Configurations with Standard DIMMs (First Instance Type)

Memory Configurations (First Instance Type)

| | | | | | | |
|---|---|---|---|---|---|---|
| Total cores | 8 | 12 | 12 | 12 | 12 | 12 |
| Rentable cores | 8 | 12 | 11 | 10 | 9 | 8 |
| Desired GB/server | 64 | 96 | 88 | 80 | 72 | 64 |
| Actual GB/server | 64 | 128 | 128 | 128 | 128 | 64 |
| Memory Configuration | 8 × 8 GB | 8 × 16 GB | 8 × 16 GB | 8 × 16 GB | 8 × 16 GB | 8 × 8 GB |

TABLE 2

Memory Configurations with Standard DIMMs (Second Instance Type)

Memory Configurations (Second Instance Type)

| | | | | | | | | |
|---|---|---|---|---|---|---|---|---|
| Total cores | 12 | 16 | 16 | 16 | 16 | 16 | 18 | 18 |
| Rentable cores | 10 | 16 | 15 | 14 | 13 | 12 | 18 | 17 |
| Desired GB/server | 160 | 256 | 240 | 224 | 208 | 192 | 288 | 272 |
| Actual GB/server | 192 | 256 | 256 | 256 | 256 | 192 | 320 | 320 |
| Memory Configuration | 8 × 16, 8 × 8 GB | 16 × 16 GB | 16 × 16 GB | 16 × 16 GB | 16 × 16 GB | 8 × 16, 8 × 8 GB | 8 × 32, 8 × 8 GB | 8 × 32, 8 × 8 GB |

TABLE 3

Memory Configurations with Standard DIMMs (Third Instance Type)

Memory Configurations (Third Instance Type)

| | | | | | | |
|---|---|---|---|---|---|---|
| Total cores | 8 | 16 | 16 | 16 | 16 | 16 |
| Rentable cores | 8 | 16 | 15 | 14 | 13 | 12 |
| Desired GB/server | 256 | 512 | 480 | 448 | 416 | 384 |
| Actual GB/server | 256 | 512 | 512 | 512 | 512 | 384 |
| Memory Configuration | 16 × 16 GB | 16 × 32 GB | 16 × 32 GB | 16 × 32 GB | 16 × 32 GB | 8 × 32 GB, 8 × 16 GB |

DRAM widths include 4 bits wide, 8 bits wide, and 16 bits wide. In some embodiments, these DRAMs serve as the building blocks with which non-standard DIMMs (e.g., those having non-standard amounts of memory capacity) may be built.

In some embodiments, the systems described herein may include non-standard DIMMs that are built using the same blank printed circuit boards (e.g., a "raw cards") that are used in building standard DIMMs, e.g., the standard circuit boards that all the integrated circuit memory devices (DRAMs) attach to and that include some other discrete, hybrid, or integrated circuit components. For example, in some embodiments, a system may include one or more 12 GB DIMMs, each of which is built using an industry standard raw card that is called a dual-rank by-8 card, i.e., a card that includes two rows of DRAM devices, and that is configured for population by DRAM devices that are 8 bits wide. Unlike with currently available DIMMs (which are populated with DRAMs having the same technology, same density, and same width), each of these 12 GB DIMMs may include two different types of memory components (e.g., DRAM devices of two different densities) on the same DIMM. In this example, one side of the DIMM may include a row of 8 Gbit×8 DRAMs, while the other side of the DIMM may include a row of 4 Gbit×8 DRAMs. Therefore, one side of the DIMM will have 8 GB of memory capacity and the other side will have 4 GB of memory capacity, resulting in a total memory capacity of 12 GB (and no more) on a single DIMM. In some embodiments, the systems described herein may also include one or more 24 GB DIMMs, or other DIMMs of non-standard sizes, along with one or more standard DIMMs. Note that, in other embodiments, the non-standard sized memory modules described herein may be built using custom printed circuit boards, rather than on industry standard raw cards.

In some embodiments, a service provider may create a fleet of servers, each including one or more standard and/or custom DIMMs, that collectively implement a variety of virtual computing resource instances of different types, configurations, and capacities using physical resources that exactly (or more closely) match the requirements of the instance types than the physical resources currently available to the service provider (e.g., using physical memory modules with finer granularity than is currently available). Tables 4-6 below illustrate example configurations that could be modified from the configurations shown in Tables 1-3 by the introduction of customized DIMMs (specifically, customized 12 GB and 24 GB memory modules). As illustrated in these tables, the introduction of these customized DIMMs may, by at least partially bridging the gaps between 8 GB and 16 GB DIMMs and between 16 GB and 32 GB modules, allow a service provider to offer a wide variety of virtual computing instance offerings, while reducing the amount of physical memory capacity that is stranded (i.e., not available for rent to customer/subscribers), when compared to the corresponding columns in the example configurations shown in Tables 1-3 above.

TABLE 4

Memory Configurations with Customized DIMMs (First Instance Type)

| | Memory Configurations (First Instance Type) | | | |
|---|---|---|---|---|
| Total cores | 12 | 12 | 12 | 12 |
| Rentable cores | 12 | 11 | 10 | 9 |
| Desired GB/server | 96 | 88 | 80 | 72 |
| Actual GB/server | 96 | 96 | 96 | 96 |
| Memory Configuration | 8 × 12 GB | 8 × 12 GB | 8 × 12 GB | 8 × 12 GB |

TABLE 5

Memory Configurations with Customized DIMMs (Second Instance Type)

| | Memory Configurations (Second Instance Type) | | | |
|---|---|---|---|---|
| Total cores | 16 | 16 | 18 | 18 |
| Rentable cores | 14 | 13 | 18 | 17 |
| Desired GB/server | 224 | 208 | 288 | 272 |
| Actual GB/server | 224 | 224 | 288 | 288 |
| Memory Configuration | 16 × 12 GB | 16 × 12 GB | 8 × 24 GB, 8 × 12 GB | 8 × 24 GB, 8 × 12 GB |

TABLE 6

Memory Configurations with Customized DIMMs (Third Instance Type)

| | Memory Configurations (Third Instance Type) | |
|---|---|---|
| Total cores | 16 | 16 |
| Rentable cores | 14 | 13 |
| Desired GB/server | 448 | 416 |
| Actual GB/server | 448 | 448 |
| Memory Configuration | 8 × 32 GB, 8 × 24 GB | 8 × 32 GB, 8 × 24 GB |

Many currently available processors include four memory channels. As noted above, when configuring a server for use in providing virtual computing resource instances, it may be desirable to populate all of these channels processor in order to allow for maximum bandwidth to be available to customers/subscribers (e.g., populating DIMMs four at a time). In some embodiments, when populating a memory channel with a smallest available DIMM (e.g., an 8 GB DIMM), the service provider may populate the server with 32 GB at a time. Similarly, with 16 GB DIMMs, the service provider may populate the server with 64 GB at a time. In other words, the memory capacity of the server may grow in relatively large increments (when using standard sized DIMMs), which may not be compatible with the number of available cores (according to the processor/memory capacity ratios defined for the virtual computing resource instances offered by the service. A next generation of processors may include six memory channels per processor, meaning that the increment at which a service provider populates memory (using standard sized DIMMs) may increase by another 50%. The systems described herein that include custom and/or odd-sized DIMMs may allow service providers more flexibility to configure servers with finer granularity to better fit the requirements of a wide variety of virtual resource instance offerings while stranding fewer physical resources than some existing systems.

In some cases, prior to creating custom or odd-sized physical memory modules (e.g., DIMMs) or populating servers with these memory modules, a service provider may analyze historical information detailing the requests that have been received by the service for different virtual computing resource instance types and configurations and/or the actual usage of the virtual computing resource instances that have been provided to customers/subscribers. The service provide may also attempt to predict future demand (e.g., requests and/or usage) for different virtual computing resource instance types and configurations (e.g., based on observed usage trends, technology trends, assumed availability of new processors and/or standard memory modules, etc.). Using this historical and/or predictive information and another information, the service provider may determine the different virtual computing resource instance types to be offered (and the types and configurations of physical resources to be provisioned for each instance type) and/or the number of virtual computing resource instances of each of these different virtual computing resource instance types for which physical resources are to be provisioned. For example, the service provider may determine that some of the virtual computing resource instance types would be well suited for implementation on servers built with non-standard sized memory modules (e.g., odd-sized DIMMs such as, but not limited to, 10 GB, 12 GB, 14 GB, 20 GB, 24 GB, or 36 GB DIMMs), in some embodiments.

In some embodiments of the service provider systems described herein, each server may support only one particular virtual computing resource instance type, with the hosted instances having the same or different processor and/or memory capacities. In some embodiments, this approach may reduce the likelihood of stranding physical processor resources or physical memory resources when implementing instances for which the required processor or memory capacity is less than the maximum processor or memory capacity that can be implemented by the physical resources of the server. For example, if an instance of the second type described above (an instance that includes 4 GB of virtualized memory for each virtual CPU) is hosted on a server that has been built to support instances of the third type (instances that include 8 GB of virtualized memory for each virtual CPU), half of the memory of the server would be stranded. Conversely, if an instance of the third type described above (an instance that includes 8 GB of virtualized memory for each virtual CPU) is hosted on a server that has been built to support instances of the second type (instances that include only 4 GB of virtualized memory for each virtual CPU), half of the processor capacity of the server would be stranded. However, in other embodiments, different types of virtual computing resource instances (e.g., instances with different processor and/or memory capacity ratios) may be hosted on a single server, which may reduce the number of different types and configurations of servers that need to be built and managed in the service provider system, and may also give the service provider more flexibility in terms of managing the overall server fleet and adapting it to customer needs and/or workloads (e.g., based on the type and volume of requests for virtual computing instances, and the processor and memory capacity requirements of the requested instances.)

Note that, in some embodiments, even after introducing one or more custom or odd-sized memory modules (e.g., a 12 GB DIMM and/or a 24 GB DIMM), there still may be certain deployments that are not optimum (e.g., deployments in which the physical resources do not exactly match the requirements to implement a virtual computing resource instance of a particular type and configuration). However, the introduction of the custom or odd-sized modules may reduce the amount of physical resources that would have been stranded had the instance been implemented using only standard memory modules due to the finer granularity of memory capacities provided by the introduction of the custom or odd-sized modules. Note that, in different embodiments, the non-standard memory module capacities that lend themselves to this approach may be different depending, for example, on the requirements of the servers that include those modules or on the configurations (and/or costs) of the available DRAMs and/or raw cards used to build them. For example, in service provider systems in which the interconnect between the DIMM and the processor is 64 bits wide and in which high-volume DRAMs are used on the DIMM, something on the order of 4 GB may be a natural increment for increasing the memory capacity for a custom DIMM. In such systems, the custom memory modules that may be best suited for introduction in the system may be those that can be built using combinations of 4 Gbit, 8 Gbit, and (eventually) 16 Gbit DRAM densities. In other embodiments (e.g., those in which the width of the DRAMs is something other than four bits or eight bits, or the width of the interconnect is something other than 64 bits), the service provider system may include servers built using odd-sized DIMMs having capacities that do not conform to a 4 GB increment.

Figure 4:
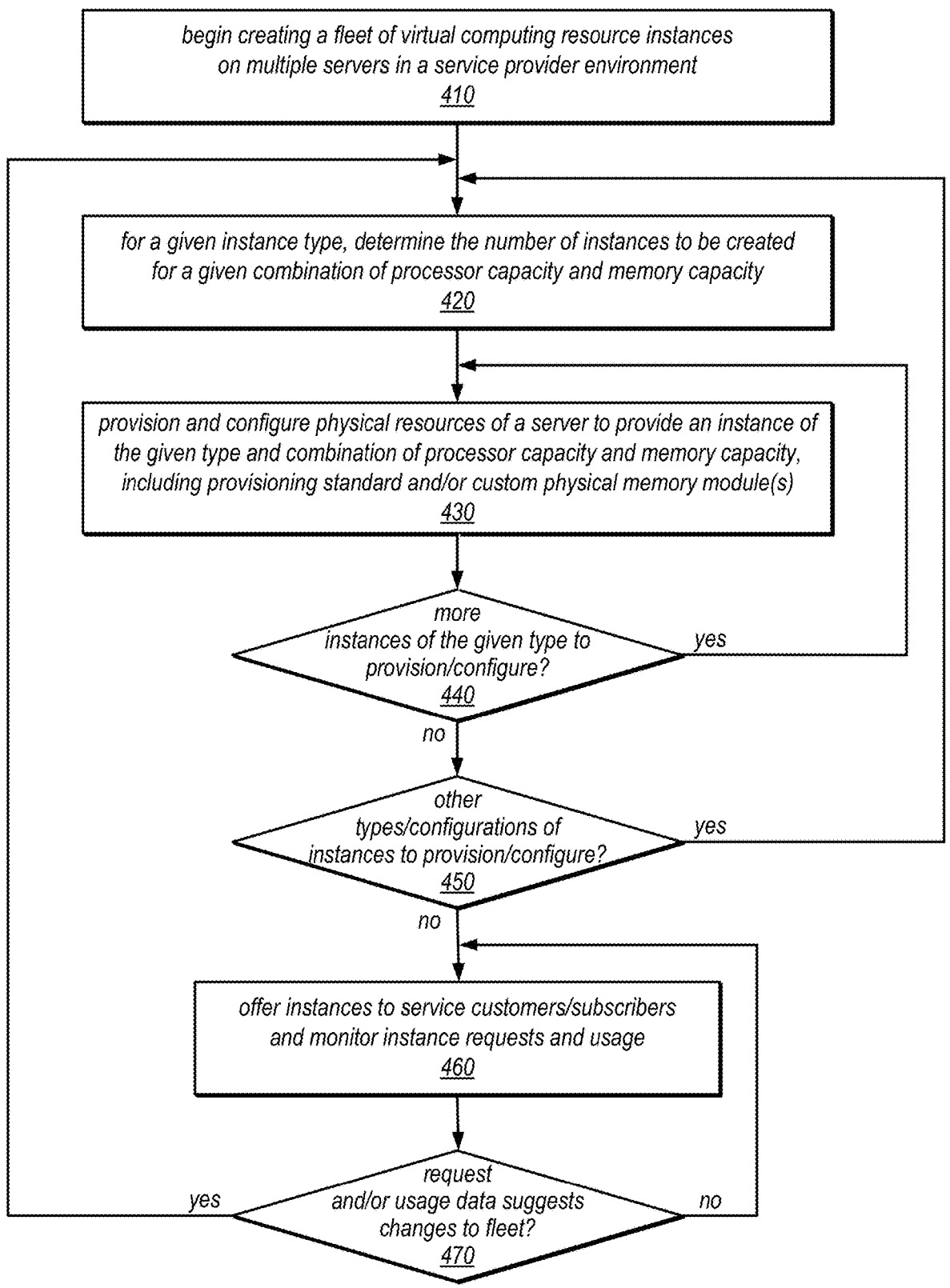
FIG. 4 is a flow diagram illustrating one embodiment of a method for creating a fleet of virtual computing resource instances to be provided to service customers/subscribers.

One embodiment of a method for creating a fleet of virtual computing resource instances to be provided to service customers/subscribers is illustrated by the flow diagram in FIG. 4. As illustrated at 410, in this example, the method may include beginning creation of a fleet of virtual computing resource instances on multiple servers in a service provider environment. The method may include, for a given instance type, determining the number of virtual computing resource instances to be created for a given combination of processor capacity and memory capacity, as in 420. For example, the method may include analyzing historical information and/or predicting future demand, as described above.

As illustrated in FIG. 4, the method may include provisioning and configuring physical resources of one of the servers to provide a virtual computing resource instance of the given type and combination of processor capacity and memory capacity, including provisioning standard and/or custom physical memory module(s), as in 430. For example, in some embodiments, the method may include provisioning one or more DIMMs having non-standard amounts of memory (e.g., a number of bytes that is not a power of two) and that may have been built using DRAM devices of two different types, sizes, and/or configurations, as described herein. If there are more virtual computing resource instances of the given type to provision/configure, the method may include repeating the operations shown in 430 for one or more additional virtual computing resource instances. This is illustrated in FIG. 4 by the feedback from the positive exit of 440 to 430. If (or once) there are no more virtual computing resource instances of the given type to provision/configure, shown as the negative exit from 440, if there are other types/configurations of instances to provision/configure, the method may include repeating the operations shown in 420-440 until all of the desired virtual computing resource instances for the fleet of virtual computing resource instances have been provisioned. This is illustrated in FIG. 4 by the feedback from the positive exit of 450 to 420.

Once all of the desired instances for the fleet have been provisioned, shown as the negative exit from 450, the creation of the fleet of virtual resource instances (e.g., using an initial configuration) may be complete, and the method may include offering instances to service customers/subscribers and monitoring instance requests and usage, as in 460. As illustrated in FIG. 4, until or unless the request and/or usage data suggests changes to fleet, the method may include continuing to offer instances to service customers/subscribers and monitor instance requests and usage. If, at some point, the request and/or usage data suggests that one or more changes should be made to the fleet of available virtual resource instances, shown as the positive exit of 470, the method may include repeating any or all of the operations illustrated in 420-470 to re-configure the fleet of virtual computing resource instances to be more compatible with observed requests and/or usage (e.g., once or as often as the data warrants). This is illustrated in FIG. 4 by the feedback from the positive exit of 470 to 420. For example, historical information may be analyzed to determine the actual usage of virtualized resources by customers/subscribers and/or trends in the usage of those resources and to predict future demand for different types and sizes/configurations of virtual computing resource instances. If the predicted demand does not match the current configuration of the system (in terms of the virtual computing resource instances that are available for the use of customers/subscribers), the physical resources of the system may be provisioned differently to provide a different mix of virtual computing resource instances (one that better matches the predicted demand).

As previously noted, physical memory modules (e.g., single in-line memory modules, which are also called "SIMMs", or dual in-line memory modules, which are also called DIMMs) may include one or more random access memory devices (e.g., DRAM or SDRAM chips) that are mounted on a printed circuit board that is typically connected to a computer motherboard over a multiple-pin connector. For example, some SIMMs include a 32-bit data path (or a 36-bit path that includes parity bits) to the motherboard over a 72-pin connector. A standard DIMM may include a 168-pin connector and may support 64-bit data transfers. In some cases, memory modules include multiple independent sets (or "ranks") of DRAM chips of the same type and size/configuration that are connected to the same address and data busses and that are, in some ways, treated by the memory controller as if they were separate banks of memory (e.g., for addressing purposes). In some embodiments, all of the DRAM devices mounted on a DIMM may be located on the same side of the printed circuit board of the DIMM, while in other embodiments, DRAM chips may be mounted on both sides of the PCB. As noted in the example memory module configurations shown in the tables above, DIMMs are often built using DRAM chips that have data widths of 4 bits or 8 bits (e.g., using nine such chips per rank or per side to handle all of the data bits plus parity information, if applicable).

In some embodiments, a serial presence detect (SPD) device (e.g., an SPD EEPROM device) on a DIMM may store information identifying the memory capacity and other operational parameters of the DIMM (e.g., the module type, the type and/or capacity of the DRAM devices, timing information for the DRAM devices and/or module, and/or other module-specific information that is needed for configuring the module for use in the service provider system). For example, in order to configure the processor to understand the memory configuration of a particular DIMM, the processor may (e.g., by executing the memory reference code described below) consult the SPD EEPROM on the DIMM to determine the configuration of the module and the DRAM devices of the module. Note that, in accordance with current industry standards, the SPD EEPROM image on a standard DIMM is not configured to allow for the mixing and matching of different DRAM devices (e.g., DRAM devices of different types, sizes, or configurations) on the same module.

In some embodiments, the service provider systems described herein may include (e.g., as part of each server) a small piece of memory reference code (sometimes referred to herein as the "MRC") that is executed to initialize the processor and that knows how to initialize the memory interface and memory modules (e.g., one or more DIMMs) that are included in the system (or server). For example, in some cases, the MRC is a small package that is integrated into a general purpose BIOS (e.g., a BIOS that was created for a given microarchitecture).

In some embodiments, in order to build and utilize the custom, non-standard sized DIMMs described herein in a service provider system, the EEPROM image for the SPD EEPROM devices on those DIMMs may need to be modified to add the capability to support DRAM devices of multiple types on the DIMMs and/or the MRC running on the system (or a server thereof) may need to be modified to be able to recognize, initialize, and utilize the full memory capacity of the custom, non-standard sized DIMMs. For example, the SPD EEPROM is a programmable device (e.g., an array of bits) on the DIMM that is programmed to tell the processor what the DIMM is. As noted above, the EEPROM image may include information identifying the type and configuration of the DIMM (and/or its constituent DRAM devices) and specifying different operational or timing parameters for the DIMM (and/or its constituent DRAM devices) that allow the processor to understand what it is talking to and to initialize the memory module correctly to function in the service provider system. As noted above, the content and format of the SPD EEPROM is defined by an industry standard, and is currently defined such that only a single DRAM technology is supported at a time on any given DIMM.

In some embodiments, the service provider systems described herein may include one or more custom, non-standard sized DIMMs, each of which includes a custom SPD EEPROM image that indicates to the processor that there are two different DRAM technologies on the DIMM at the same time. The current industry standard for the SPD EEPROM image defines four sections of the image. One section contains information about the configuration of the DIMM (including configuration and timing information for a single type of DRAM devices on the memory module), one section contains information about the manufacturing of the DIMM, one section is currently reserved, and the last section is usable by end users. In some embodiments of the service provider systems described herein, the custom, non-standard sized DIMMs created for the systems may take advantage of the portion of the EEPROM image that usable by end users. For example, this portion of the EEPROM may have programmed into it (e.g., by the service provider or by a supplier or creator of the custom, non-standard sized DIMM) a second level of information that describes a second type of DRAM devices on the memory module (e.g., DRAM devices in a different row or rank than those described in the first section of the EEPROM). In other words, in some embodiments, one section of the custom SPD EEPROM device may describe configuration and timing information for one row (or rank) of DRAM devices and another section of the custom SPD EEPROM device may describe configuration and timing information for another row (or rank) of DRAM devices. Note that much of the information in the two sections may be identical (e.g., information that is not specific to the types or capacities of the DRAM devices in each row or rank). In an example custom DIMM described above, one section of the SPD EEPROM may describe a row of 8 Gbit×8 DRAMs, while the other section of the SPD EEPROM may describe a row of 4 Gbit×8 DRAMs.

As previously noted, the SPD EEPROM on a DIMM may work in conjunction with a portion of code (the MRC) on the server to allow the memory module to be initialized to function in the service provider system (i.e., to provide the underlying physical memory resources for a corresponding virtual computing resource instance). In some embodiments, this low-level software that runs inside the BIOS in the service provider system may be used to initialize different parts of the platform, specifically, the memory interface and memory modules. In some embodiments of the service provider systems described herein, an MRC that was created for a system that includes only standard DIMMs (e.g., DIMMs that include DRAM devices of a single technology, type, and configuration and/or that include a number of bytes of physical memory that is a power of two) may be modified to allow it to access an indicator in a custom SPD EEPROM and to understand whether (or not) it indicates that there are two sets of configuration/timing information (e.g., one for each of two types of DRAM devices on the DIMM) that it needs to take into account when initializing, configuring, and utilizing the memory capacity provided by the DIMM.

In some embodiments, a previously unused field in the end user section of the SPD may be configured to act as such an indicator. For example, in one embodiment, the MRC may be modified so that it looks for the value of a particular bit in the end user portion of the SPD. The value of this bit may indicate to the MRC whether there is a single type of memory technology (i.e., a single type of integrated circuit memory device, such as multiple DRAM devices of a single type, size and configuration) on the DIMM or two types of memory technologies (e.g., multiple types of integrated circuit memory devices, such as DRAM devices of multiple different types, sizes, and/or configurations) on the DIMM. Based on this indication, the MRC may be able to determine how many areas within the SPD need to be examined for memory configuration information.

In some embodiments, the changes made to a standard SPD EEPROM and standard MRC to support the use of non-standard DIMMs in the service provider system may cause the processor to treat the non-standard DIMM as if it were two standalone DIMMs (or as if it were functionally equivalent to two standalone DIMMs), regardless of the fact that it includes separate rows or ranks of DRAMs of different technologies, types, and/or sized that are "packaged" together on the same memory module card. For example, the processor may (based on the modifications to the MRC) treat a 12 GB DIMM as if it were two separately DIMMs, e.g., an 8 GB DIMM and a 4 GB DIMM that are built on two separate printed circuit boards. In other words, to the reference code, it may appear (from a logical standpoint) as if there were two memory modules in the system that collectively provide 12 GB of memory capacity, regardless of whether or not they are implemented on the same physical card.

As noted above, some of the code within the MRC may be configured to program the memory controller in a processor on the host machine to understand what type and/or amount of memory is populated on each memory channel of the processor. In some embodiments, the memory controller in the processor may be flexible enough to handle both standard sized memory modules and non-standard sized memory modules, when programmed accordingly. In some embodiments in which a standard MRC is modified to support non-standard sized memory modules, the modifications may be hidden from other service providers or potential other users of the odd-sized DIMMs. For example, the modified code in the MRC may be on a different branch than the standard code, and the MRC code may be forked in a manner that makes it not visible to others.

Note that, in general, the physical memory modules employed in the service provider systems described herein may include any of three flavors of physical memory modules. For example, an "unbuffered DIMM" may include bare DRAM devices that sit on the memory interfaces (e.g., on the data, address, and command lines). A "registered DIMM" may add a buffer or a re-driver on the address and command portions of the DRAM interface. A "load reduced DIMM" (or "LR DIMM") may add yet another buffer (e.g., to the data portion of the DRAM interface), such that the full DRAM interface is buffered. In some embodiments, adding these buffers may allow higher capacity DIMMs to run at faster speeds than would be possible without them. Note that the techniques described herein for creating, configuring, and utilizing non-standard sized DIMMs may be applied in systems in which the DIMMs are built using any of these flavors of memory modules, or with memory modules of other flavors that are not described herein.

Note that, in some embodiments, the service provider may create configurations on a host machine (or server thereof) that include both custom (e.g., non-standard sized) DIMMs and standard DIMMs. In one example, the machine or server may be configured such that two processor channels are populated with 12 GB DIMMs and two other processor channels are populated with 16 GB DIMMs. In other embodiments, the service provider may create configurations on a host machine (or server thereof) that exhibit symmetry across the channels (e.g., all channels may be populated with the same amount of memory). However, in these systems, the availability of non-standard sized DIMMs may allow the mixing of multiple standard and/or custom DIMMs on each single channel. In some systems, each channel may be populated by multiple DIMMs, any one of which may be a custom or standard DIMM. In one example, each channel of the processor on the host machine (or server thereof) may be populated with 20 GB of memory (using, e.g., a standard 8 GB DIMM plus a custom 12 GB DIMM). Such a configuration may or may not be more cost effective than one in which each channel is populated with 20 GB of memory using a standard 16 GB DIMM plus a standard 4 GB (e.g., due to pricing based on volumes and demand for each of the standard and custom DIMMs). The availability of custom, non-standard sized DIMMs may provide greater flexibility for the service provider to make trade-offs between the cost of different DIMMs and the utilization of the memory capacity they provide (e.g., trade-offs between the costs associated with stranding resources and the costs of not stranding them by employing non-standard sized DIMMs).

Figure 5A:
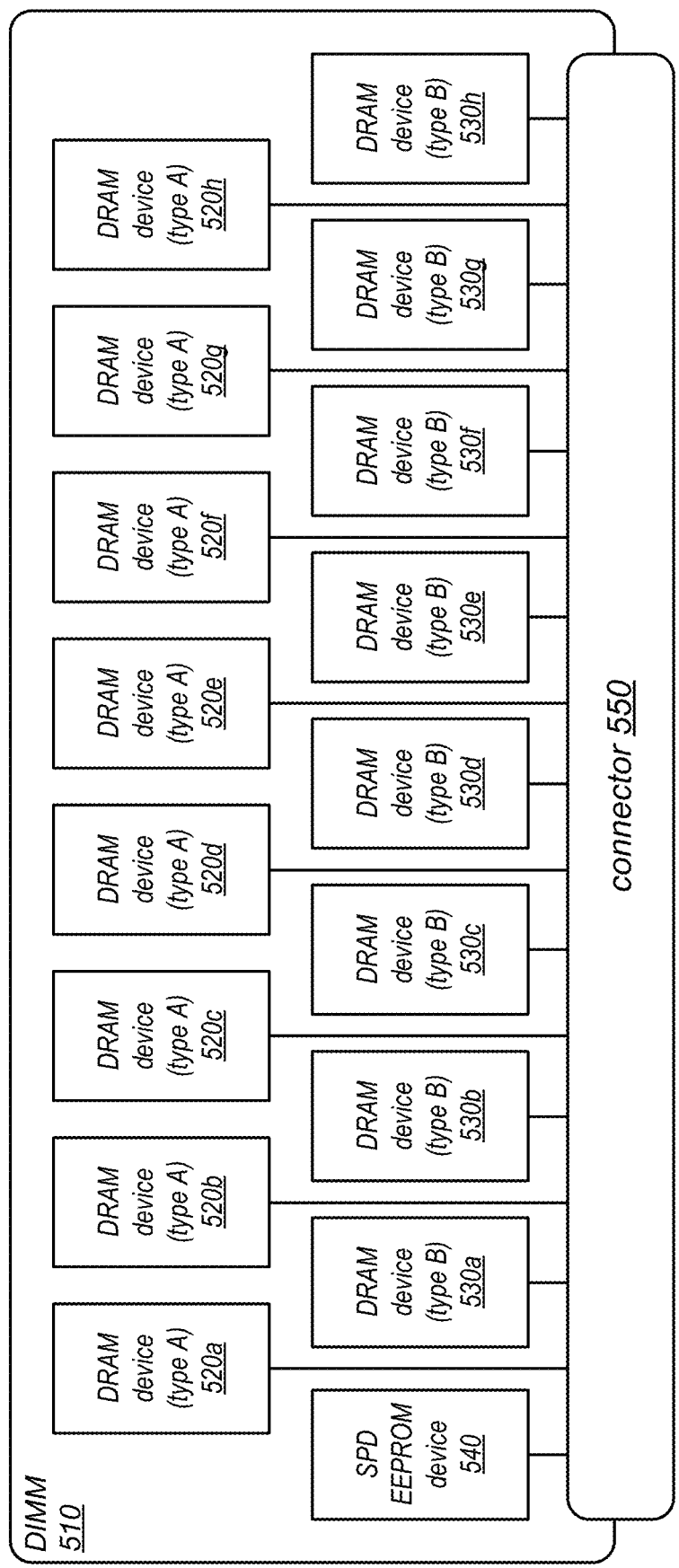
FIGS. 5A and 5B are block diagrams illustrating example embodiments of memory modules that provide non-standard amounts of memory.

One example of a memory module that provides a non-standard amount of memory is illustrated by the block diagram in FIG. 5A, according to at least some embodiments. More specifically, FIG. 5A illustrates the logical configuration of a non-standard DIMM, which may or may not correspond to its physical configuration. For example, while the non-standard DIMM illustrated in FIG. 5A includes two rows (or ranks) of DRAM devices that appear to be co-located on the printed circuit board (e.g., on the same side of the card), in some embodiments, the two rows (or ranks) may be located on opposite sides of the printed circuit board on which they are mounted. As previously noted, the non-standard sized memory modules described herein may be built using custom printed circuit boards (e.g., cards that are specifically configured to include multiple rows or ranks of memory devices of different types, technologies, and/or sizes and a custom SPD for use with a corresponding custom MRC) or on industry standard raw cards, in different embodiments.

In the example illustrated in FIG. 5A, DIMM 510 includes multiple integrated circuit memory devices (DRAMs) of each of two different types. For example, DIMM 510 includes eight DRAM devices of a type A (shown as DRAM devices 520a-520h), and eight DRAM devices of a type B (shown as DRAM devices 530a-530h). As described herein, DRAM devices of type A may be of a different size and/or configuration than DRAM devices of type B. In one example, DRAM devices 520a-520h (of type A) may be 8 Gbit DRAM devices, while DRAM devices 530a-530h (of type B) may be 4 Gbit DRAM devices. In this example, DIMM 510 would provide 12 GB of memory for use in implementing virtualized memory for a virtual computing resource instance. Note that other combinations of DRAM devices and device types may be included on a DIMM such as DIMM 510 (one that is configured to allow its population by DRAM devices of different types) to provide other non-standard amounts of memory for use in implementing virtualized memory, in other embodiments.

As illustrated in this example, DIMM 510 may also include a custom serial presence detect (SPD) EEPROM device 540. For example, SPD EEPROM device 540 may be an SPD EEPROM device that has been programmed to include configuration information for the non-standard DIMM and its constituent DRAM devices (in this case, DRAM devices of two different types), as described herein. As illustrated in FIG. 5A, DIMM 510 may also include a connector 550 through which a processor (or a processor core or thread thereof) communicates with DIMM 510 (e.g., over one of a plurality of memory channels). Note that a non-standard DIMM such as that illustrated in FIG. 5A may, in different embodiments, be built on a standard raw card that was designed to be populated by DRAM devices of a single type, technology, and size on two rows (or ranks), or may be built on a custom raw card that is configured to be populated by DRAM devices of multiple types, technologies and/or sizes.

Figure 5B:
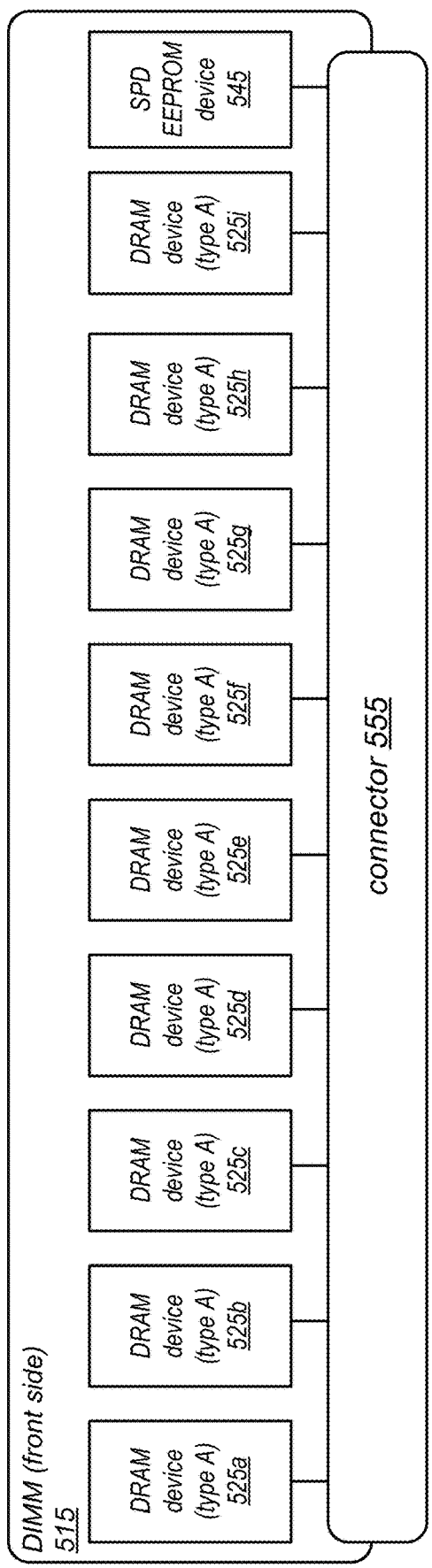
Figure 5B:
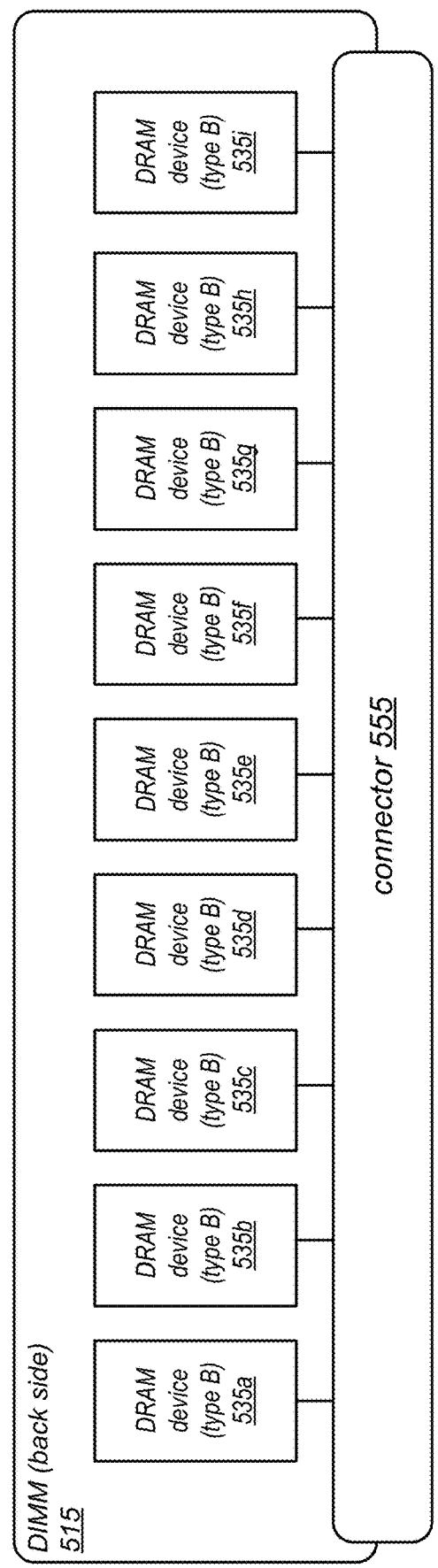

Another example of a memory module that provides a non-standard amount of memory is illustrated by the block diagram in FIG. 5B, according to at least some embodiments. More specifically, FIG. 5B illustrates the logical configuration of a non-standard DIMM in which the rows (or ranks) of two different types of DRAM devices are located on opposite sides of the printed circuit board on which they are mounted. As previously noted, the non-standard sized memory modules described herein may be built using custom printed circuit boards (e.g., cards that are specifically configured to include multiple rows or ranks of memory devices of different types, technologies, and/or sizes and a custom SPD for use with a corresponding custom MRC) or on industry standard raw cards, in different embodiments.

In the example illustrated in FIG. 5B, DIMM 515 includes multiple integrated circuit memory devices (DRAMs) of each of two different types. In this example, each row (rank) includes an additional DRAM device (e.g., one more than would otherwise be required to provide the desired amount of memory capacity) in order to provide ECC-capable memory (i.e., memory that implements an error-correcting code). For example, DIMM 515 includes nine DRAM devices of a type A on the front side (shown as DRAM devices 525a-525i), and nine DRAM devices of a type B on the back side (shown as DRAM devices 535a-535i). As in the previous example, DRAM devices of type A may be of a different size and/or configuration than DRAM devices of type B. In one example, DRAM devices 525a-525i (of type A) may be 16 Gbit DRAM devices, while DRAM devices 535a-535i (of type B) may be 4 Gbit DRAM devices. In this example, DIMM 515 would provide 20 GB of ECC-capable memory for use in implementing virtualized memory for a virtual computing resource instance. Again note that other combinations of DRAM devices and device types may be included on a DIMM such as DIMM 515 (one that is configured to allow its population by DRAM devices of different types on the same or different sides of the DIMM) to provide other non-standard amounts of ECC-capable memory for use in implementing virtualized memory, in other embodiments. Note that in other embodiments, the non-standard sized physical memory modules described herein may implement other types of error checking. For example, in some embodiments, the integrated circuit memory devices (e.g., DRAM devices) that populate a non-standard sized DIMM may include parity bits.

As in the previous example, DIMM 515 may also include a custom serial presence detect (SPD) EEPROM device 545. For example, SPD EEPROM device 545 may be an SPD EEPROM device that has been programmed to include configuration information for the non-standard DIMM and its constituent DRAM devices (in this case, DRAM devices of two different types), as described herein. As illustrated in FIG. 5B, DIMM 515 may also include a connector 555 through which a processor (or a processor core or thread thereof) communicates with DIMM 515 (e.g., over one of a plurality of memory channels). Again note that a non-standard DIMM such as that illustrated in FIG. 5B may, in different embodiments, be built on a standard raw card that was designed to be populated by DRAM devices of a single type, technology, and size on two rows (or ranks), or may be built on a custom raw card that is configured to be populated by DRAM devices of multiple types, technologies and/or sizes.

Figure 6A:
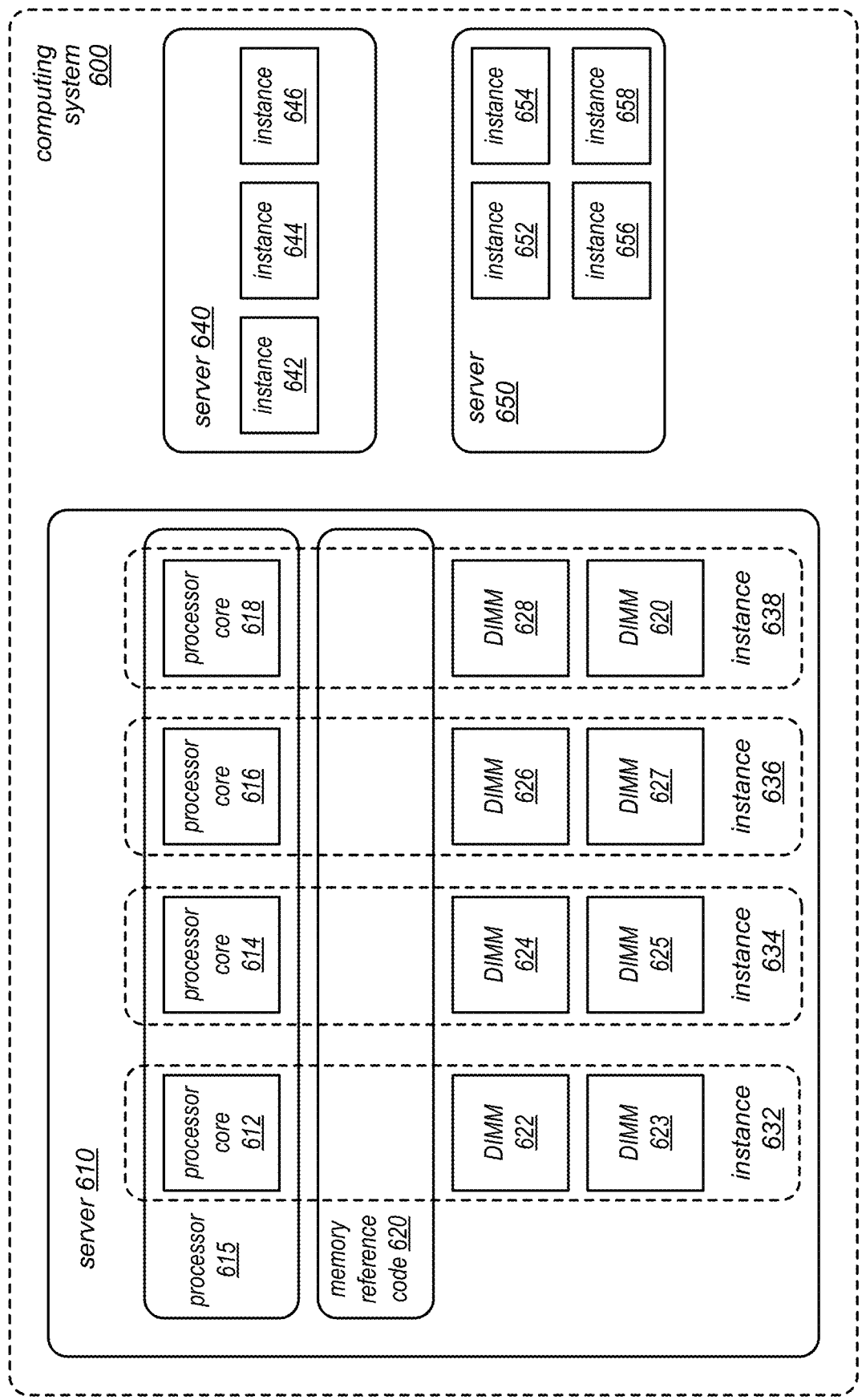
FIGS. 6A and 6B are block diagrams illustrating one embodiment of a computing system of a virtual computing services provider.
Figure 6B:
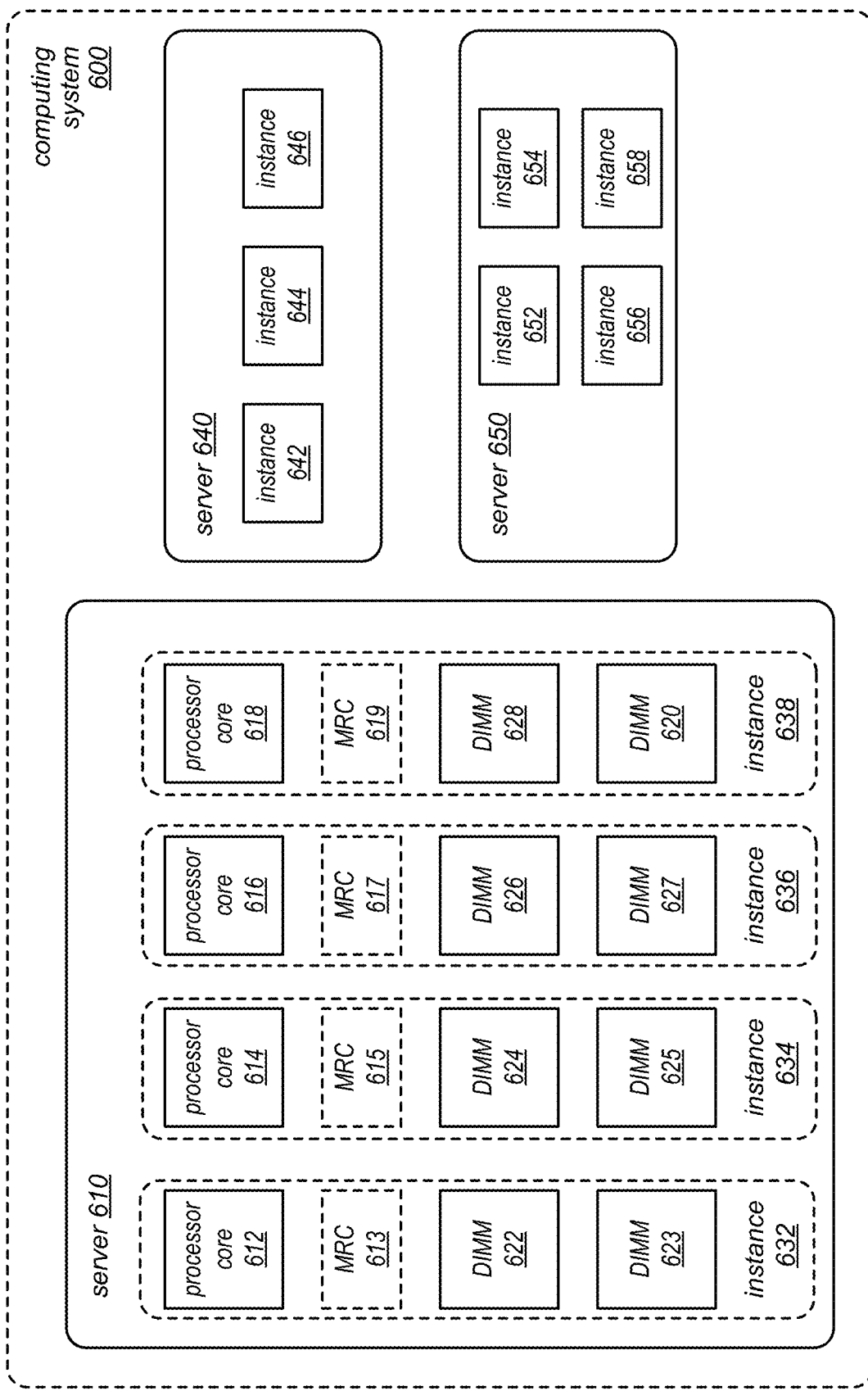

One example of computing system of a virtual computing services provider is illustrated by the block diagrams in FIGS. 6A and 6B, according to at least some embodiments. As illustrated in FIG. 6A, computing system 600 includes a server 610, which hosts four virtual computing resource instances (shown as 632, 634, 636, and 638). Server 610 includes a pool of physical resources that may be provisioned (or portions of which may be provisioned) to implement these virtual computing resource instances. For example, server 610 includes a processor 615 that comprises multiple processor cores (shown as processor cores 612, 614, 616, and 618) each of which may implement the virtual processors of respective ones of the virtual computing resource instances. Server 610 also includes multiple physical memory modules (shown as DIMMs 622-629) and memory reference code 620 (which may be used to configure the physical memory modules, and interfaces thereto, that implement virtualized memory for respective ones of the virtual computing resource instances).

In this example, virtual computing resource instance 632 includes a virtual processor that is implemented by processor core 612 and virtualized memory implemented by two physical memory modules (shown as DIMM 622 and DIMM 623). As described herein, memory reference code 620 (or a portion thereof) may include code that has been modified to determine whether one or both of the physical memory modules (DIMM 622 and/or DIM 623) are non-standard memory modules that include DRAM devices of multiple types, technologies and/or sizes, and to initialize and configure the memory modules and the memory interface to those memory modules accordingly. Similarly, virtual computing resource instance 634 includes a virtual processor that is implemented by processor core 614 and virtualized memory implemented by memory modules DIMM 624 and DIMM 625; virtual computing resource instance 636 includes a virtual processor that is implemented by processor core 616 and virtualized memory that is implemented by memory modules DIMM 626 and DIMM 627; and virtual computing resource instance 638 includes a virtual processor that is implemented by processor core 618 and virtualized memory that is implemented by memory modules DIMM 628 and DIMM 629. Note that while the example computing system illustrated in FIG. 6A includes a single server-wide MRC 620 for server 610, in other embodiments, the server may include a separate MRC for each virtual computing resource instance, or separate portions of a single server-side MRC may be used to configure respective ones of the virtual computing resource instances.

In the example illustrated in FIG. 6A, each virtual computing resource instance includes virtualized memory that is implemented by two physical memory modules (e.g., two DIMMs). However, in other embodiments, or for other virtual computing resource instances hosted by computing system 600 (e.g., on servers 640 and/or 650), each virtual computing resource instance may include virtualized memory that is implemented by a different number of physical memory modules (e.g., one DIMM, or more than two DIMMs). In some embodiments, the physical memory modules that collectively provide resources on which to implement virtualized memory for a virtual computing resource instance may be of different types or sizes. For example, one or both of two physical memory modules that collectively provide resources on which to implement virtualized memory for a virtual computing resource instance may be odd-sized (e.g., they may include a number of bytes of physical memory that is not a power of two). In some embodiments, any or all of the DIMMs illustrated in FIG. 6A or included in servers 640 or 650 may be similar to DIMM 510 illustrated in FIG. 5A or DIMM 515 illustrated in FIG. 5B. Note that in some embodiments, for each of the virtual computing resource instances of server 610, each of which employs the underlying physical resources of two DIMMs, the corresponding MRC may include two sections of configuration code (e.g., one for each DIMM). Note also that the virtual computing resource instances hosted on server 610 may be of the same type or may be of two or more different types, in different embodiments.

In this example, computing system 600 also includes a server 640 and a server 650, each of which hosts additional virtual computing resource instances. For example, server 640 hosts three virtual computing resource instances (shown as 642, 644, and 646) and server 650 hosts four virtual computing resource instances (shown as 652, 654, 656, and 658). Note that each of the virtual computing resource instances hosted on servers 640 and 650 may include virtualized resources that are implemented by physical resources such as those that implement the virtualized resources of virtual computing resource instances 632, 634, 636, and 638 hosted on server 610. In some embodiments, the virtual computing resource instances hosted on servers 640 and 650 may be of the same type(s) as various ones of the virtual computing resource instances hosted on server 610 or of different types. In one example, server 610 may host instances of one type (which may or may not include the same processor and/or memory capacities), 640 may host instances of another type (each with the same or different processor and/or memory capacities), and 650 may host instances of yet another type (each with the same or different processor and/or memory capacities). Note that while, in this example, three servers are shown as being implemented by a computing system 600, in some embodiments, these servers may be implemented on one or more computing nodes of a distributed system. For example, each of the servers 610, 640, and 650 may be implemented on a different computing node and/or the computing node(s) on which servers 610, 640, and 650 are implemented may implement one or more other servers.

As noted above, in some embodiments, the memory reference code for virtual computing resource instances 632, 634, 636, and 638 may be implemented separately for each virtual computing resource instance, or separate portions of a single server-side MRC may be used to configure respective ones of the virtual computing resource instances. In other embodiments, a single server-wide MRC may be used to configure the physical memory modules and interfaces thereto for all of the virtual computing resource instances. In any of these cases, each virtual computing resource instance may be thought of as being configured using a separate logical MRC process. Similarly, although the processor cores that are provisioned for the use of virtual computing resource instances 632, 634, 636, and 638 are all processor cores of a single processor 615, in this example, they may be thought of (from a logical standpoint) as being separate and distinct processor cores (e.g., processor cores that may or may not be implemented by the same physical integrated circuit device). FIG. 6B illustrates a logical view computing system 600 in which each instance is configured by a respective (logical) MRC process (shown as MRCS 613, 615, 617, and 619), and includes a respective one of the processor cores of processor 615 (shown as processor cores 612, 614, 616, and 618).

As previously noted, there may be any number of different configurations of instances within a family of virtual computing instances of a particular type, and, different virtual computing resource instances of the a given type may be implemented using different underlying physical processors, may include different numbers of the available virtual CPUs of the underlying physical processors, may operate at different clock speeds, may have different network performance profiles, may have access to different amounts and/or types of storage resources, or may differ from each other in other ways. For example, some instances may have access to cloud-based storage (e.g., block-based storage), while others may have access to disk storage or storage on one or more sold state drives. Table 7 below illustrates some example virtual computing resource instance configurations, according to at least some embodiments. Note that the memory column lists the amount of virtualized memory for each instance in terms of GiB, where one GiB=1.07374 GB. For example, 7.5 GiB is approximately equal to 8 GB.

TABLE 7

Example instance configurations

| instance type and size | virtual CPUs | memory (e.g., DRAM) (in GiB) | storage (in GB) |
|---|---|---|---|
| type 1 extra large | 4 | 7.5 | cloud-based block storage or 2 × 40 SSD |
| type 2 medium | 1 | 3.75 | 1 × 4 SSD |
| type 2 large | 2 | 7.5 | 1 × 32 SSD |
| type 3 4XL | 16 | 122 | 1 × 320 SSD |

Figure 7:
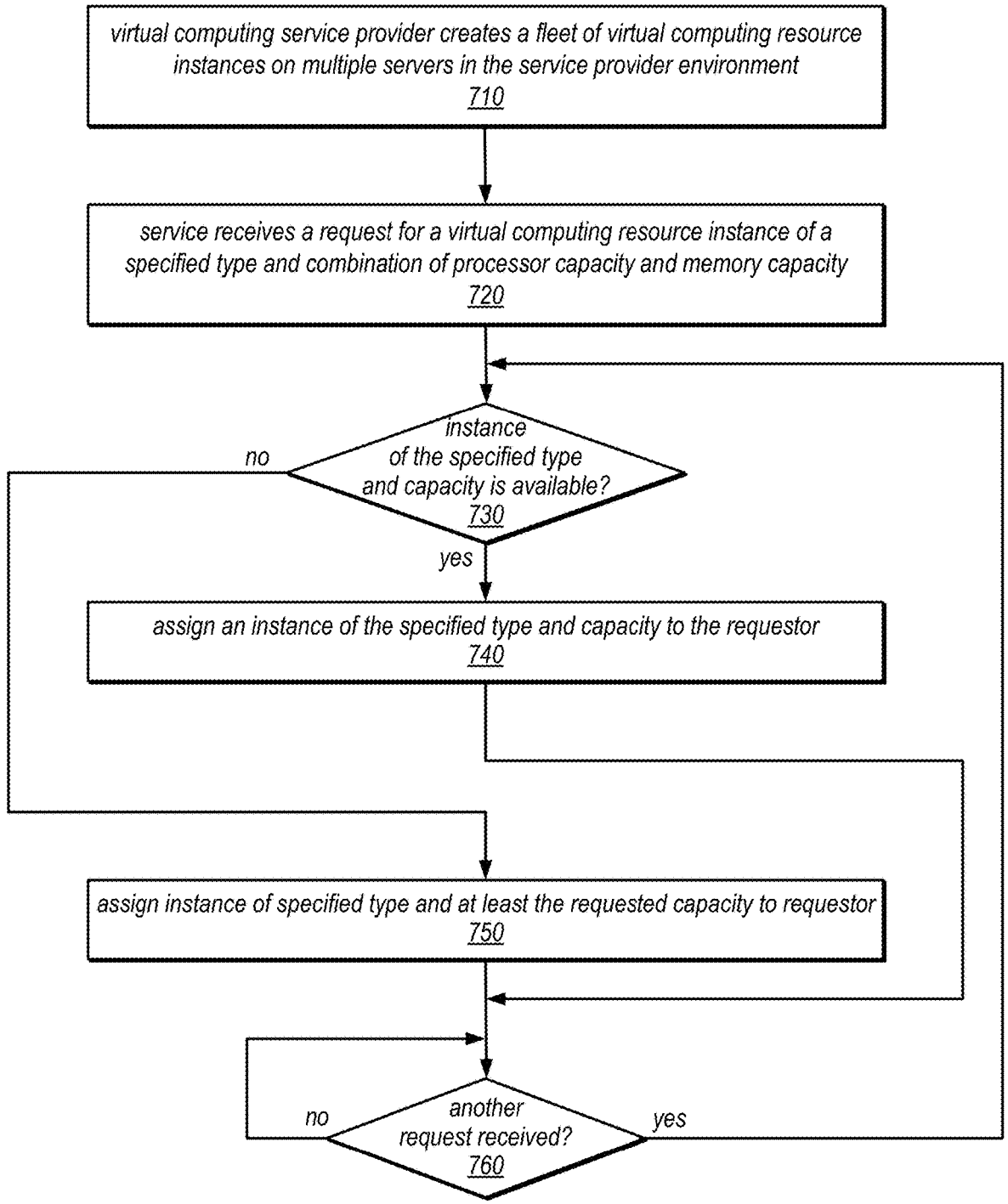
FIG. 7 is a flow diagram illustrating one embodiment of a method for providing virtual computing resource instances to clients.

One embodiment of a method for providing virtual computing resource instances to clients (e.g., service customers or subscribers) is illustrated by the flow diagram in FIG. 7. As illustrated at 710, in this example, the method may include a virtual computing service provider creating a fleet of virtual computing resource instances on multiple servers in the service provider environment. In some embodiments, creation of the fleet of instances may be performed using a method similar to that illustrated in FIG. 4 and the number, types, and capacities of the instances created by the service (e.g., the variety and granularity of instances made available by the service) may be based on historical requests/usage and/or predicted demand. The method may also include the service receiving (e.g., from a service customer or subscriber) a request for a virtual computing resource instance of a specified type and having a particular combination of processor capacity and memory capacity, as in 720. For example, in various embodiments, the request may specify a particular virtual computing resource instance type and processor capacity (which may imply a corresponding memory capacity, according to a predetermined ratio of memory capacity to processor capacity for the specified instance type) or may specify a particular instance type and memory capacity (which may imply a corresponding processor capacity, according to a predetermined ratio of memory capacity to processor capacity for the specified instance type).

As illustrated in this example, if a virtual computing resource instance of the specified type and desired capacity is available, shown as the positive exit from 730, the method may include assigning an instance of the specified type and capacity to the requestor, as in 740. For example, the service may assign to the requestor a virtual resource instance for which the virtualized memory is implemented using one or more underlying physical memory modules that collectively provide exactly the desired amount of virtualized memory, according to the predetermined ratio of memory capacity to processor capacity for the specified instance type. However, if an instance of the specified type and desired capacity is not available, shown as the negative exit from 730, the method may include the service assigning an instance of the specified type and having at least the requested processor and memory capacity to the requestor, as in 750. For example, the service may assign to the requestor a virtual resource instance for which the virtualized memory is implemented using one or more underlying physical memory modules that collectively provide more than the desired amount of virtualized memory, according to the predetermined ratio of memory capacity to processor capacity for the specified instance type. Note that, in this case, some of the physical memory implemented on the underlying physical memory module(s) may be stranded (i.e., it may not be assignable to service customers or subscribers). However, if the service provider has created a fleet of virtual computing resource instances that includes a wide variety of virtual computing resource instances (e.g., with respect to their types and processor/memory capacities), the amount of memory that is stranded may be greatly reduced when compared to previous systems that do not have as much granularity in the types and sizes of virtual computing resource instance offerings that can be provided to service customers or subscribers.

As illustrated in FIG. 7, when and if any additional requests for virtual computing resource instances are received by the service, shown as the positive exit from 760, the method may include repeating the operations illustrated in 730-750 for each additional request. This is illustrated in FIG. 7 by the feedback from the positive exit of 760 to 730.

As described in detail herein, some embodiments of the service provider systems described herein may include a fleet of virtual computing resource instances of different types and having a wide variety of processor and memory capabilities, some of which are implemented using underlying physical resources that include one or more custom memory modules (e.g., non-standard sized DIMMs that each include DRAMs of multiple technologies, types, and/or sizes). The creation of such a fleet of virtual resource instances (which may include a finer granularity of memory capacity choices than other systems and which may be better matched to demand for virtual resource instances having particular processor and memory capacities) may allow the server provider to utilize all (or a greater portion) of the physical resources it employs in providing virtual computing resources to customers/subscribers than do systems in which only standard memory modules are employed. For example, it may allow the service provider to meet customer/subscriber requests for virtual resource instances using physical resources of host machines that exactly (or more closely) match predefined ratios between virtual CPUs and virtualized memory capacity for a wide variety of instance types (or families of virtual resource instances).

As previously noted, an SPD EEPROM on a standard or custom DIMM may store information about different timing parameters for the DIMM. For example, the SPD EEPROM may define the timing parameters that are set for the reading and writing of data and for refreshing and keeping the data alive in a DRAM cell. Note that these timing parameters may vary by vendor, e.g., based on the process technologies in which the DRAM devices are built (e.g., 20 nanometer, 25 nanometer, etc.) and the electrical characteristics of their die. In some embodiments, a custom SPD EEPROM image on a custom DIMM may include information about multiple types of DRAMs on the DIMM according to a custom specification (one that has been modified from an industry standard SPD specification). For example, the custom SPD EEPROM image definition may identify multiple sets of fields in which timing information for the different types of DRAM devices is programmed. In this example, memory module vendors may be able to build non-standard sized DIMMs and populate the custom SPD EEPROMs on those modules based on the DRAM technologies that are included on the DIMMs. In this example, corresponding MRCs (e.g., general purpose MRCs or custom MRCs) on the host may be configured to read the information from these custom SPD EEPROMs to configure the DIMMs for use in a service provider system.

Note that, in some embodiments, the non-standard memory modules described herein may exhibit advantages with respect to signal integrity when compared with systems in which non-standard memory capacity requirements are met using two separate memory modules. For example, the signal integrity for a custom 12 GB DIMM (a DIMM in which two types of DRAM devices are mounted close together on a common printed circuit board) may be cleaner and have more margin than if 12 GB of memory capacity were provided on a memory channel using two standard DIMMS (e.g., a standard 8 GB DIMM plus a standard 4 GB DIMM). Therefore, the virtual computing resource instance may be able to run faster when it is implemented using a custom 12 GB DIMM than when it is implemented with a standard 8 GB DIMM plus a standard 4 GB DIMM. As illustrated in this example, the introduction of custom, non-standard sized DIMMs such as those described herein may provide benefits to the service provider in two dimensions: price and performance.

Note that while the physical resources of several of the example server provider systems described herein include one or more non-standard sized DIMMs that contain DRAM devices, the techniques described herein for creating, configuring, and utilizing non-standard sized DIMMs (including populating a physical memory module card with memory devices of different types, configurations, and/or sizes to allow for finer granularity in service offerings) may be applied to create, configure, and utilize non-standard sized physical memory modules of other types, in other embodiments. For example, non-standard sized small outline DIMMS (SO-DIMMs), DIMMs containing DDR SDRAM devices (DDR DIMMs), DIMMs that include RDRAM devices that employ Rambus® technology from Rambus, Inc. (e.g., RIMM™ devices or SO RIMM devices) and/or microDIMMs may be created, configured, and utilized using a similar approach, in other embodiments.

In some embodiments, the service provider systems described herein may provide virtual computing resource instances to clients (e.g., to service customers and/or subscribers) within provide networks. FIG. 8 illustrates an example provider network that provides private networks on the provider network to at least some clients, according to at least some embodiments. A client's virtualized private network 860 on a provider network 800, for example, may enable a client to connect their existing infrastructure (e.g., client devices 852) on client network 850 to a set of logically isolated resource instances (e.g., VMs 824A and 824B and storage 818A and 818B), and to extend management capabilities such as security services, firewalls, and intrusion detection systems to include their resource instances.

In some embodiments, a client's virtualized private network 860 may be connected to a client network 850 via a private communications channel 842. A private communications channel 842 may, for example, be a tunnel implemented according to a network tunneling technology or some other peering connection over an intermediate network 840. The intermediate network may, for example, be a shared network or a public network such as the Internet. Alternatively, a private communications channel 842 may be implemented over a direct, dedicated connection between virtualized private network 860 and client network 850.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 860 for a client on provider network 800, one or more resource instances (e.g., VMs 824A and 824B and storage 818A and 818B) may be allocated to the virtualized private network 860. Note that other resource instances (e.g., storage 818C and VMs 824C) may remain available on the provider network 800 for other client usage. A range of public IP addresses may also be allocated to the virtualized private network 860. In addition, one or more networking devices (routers, switches, etc.) of the provider network 800 may be allocated to the virtualized private network 860. A private communications channel 842 may be established between a private gateway 862 at virtualized private network 860 and a gateway 856 at client network 850.

In at least some embodiments, in addition to, or instead of, a private gateway 862, virtualized private network 860 may include a public gateway 864 that enables resources within virtualized private network 860 to communicate directly with entities (e.g., network entity 844) via intermediate network 840, and vice versa, instead of or in addition to via private communications channel 842.

In some embodiments, virtualized private network 860 may be, but is not necessarily, subdivided into two or more subnets (not shown). For example, in implementations that include both a private gateway 862 and a public gateway 864, the private network may be subdivided into a subnet that includes resources (VMs 824A and storage 818A, in this example) reachable through private gateway 862, and a subnet that includes resources (VMs 824B and storage 818B, in this example) reachable through public gateway 864. In other embodiments, one or more of the VMs 824 may be configured to access client network 850 over a private communications channel 842 through private gateway 862 (e.g., via a network interface that is configured for communication between the VM 824 and a client device 852) and to access other network entities 844 over an alternate communications channel 846 through public gateway 864 (e.g., via a network interface that is configured for communication between the VM 824 and external resources, computing systems, data centers, or Internet destinations on networks other than the provider network 800 and the client network 850, either or both of which may employ an IP tunneling technology, as described herein). In still other embodiments, private and/or public gateways and communication channels (including a private gateway 862, public gateway 864, private communications channel 842, alternate communications channel 846, and/or intermediate network 840) may be used in any of a variety of different combinations for communication between VMs 824, client network 850, and other network entities 844.

In some embodiments, the client may assign particular client public IP addresses to particular resource instances in virtualized private network 860. A network entity 844 on intermediate network 840 may then send traffic to a public IP address published by the client; the traffic is routed, by the provider network 800, to the associated resource instance. Return traffic from the resource instance may be routed, by the provider network 800, back to the network entity 844 over intermediate network 840. Note that routing traffic between a resource instance and a network entity 844 may require network address translation to translate between the public IP address and the private IP address of the resource instance.

At least some embodiments may allow a client to remap public IP addresses in a client's virtualized private network 860 as illustrated in FIG. 8 to devices on the client's external network 850. When a packet is received (e.g., from network entity 844), the network 800 may determine that the destination IP address indicated by the packet has been remapped to an endpoint on external network 850 and handle routing of the packet to the respective endpoint, either via private communications channel 842, alternate communications channel 846, or intermediate network 840. Response traffic may be routed from the endpoint to the network entity 844 through the provider network 800, or alternatively may be directly routed to the network entity 844 by the client network 850. From the perspective of the network entity 844, it may appear as if the network entity 844 is communicating with the public IP address of the client on the provider network 800. However, the network entity 844 may actually be communicating with the endpoint on client network 850.

While FIG. 8 shows network entity 844 on intermediate network 840 and external to provider network 800, in other embodiments, a network entity may be an entity on provider network 800. For example, one of the resource instances provided by provider network 800 may be a network entity that sends traffic to a public IP address published by the client. In some embodiments, this traffic may be sent via a network interface of a VM 824 that is separate and distinct from a network interface over which traffic between the VM 824 and client network 850 is sent.

Illustrative System

In at least some embodiments, a system that implements some or all of the techniques for providing virtual computing resource instances to service customers/subscribers using physical resources that may include custom, non-standard sized memory modules, as described herein, may include one or more general-purpose computer systems that include or is configured to access a non-transitory computer-accessible (e.g., computer-readable) media, such as computer system 900 illustrated in FIG. 9. In various embodiments, any or all of the computer system components described herein (including, e.g., data center computers, and/or other components on a service provider network that collectively provide virtual computing services and/or virtual storage services, virtualized computing resource instances, virtual machines, virtual machine monitors or hypervisors, or client computing devices, firewalls, or other components on a client network) may be implemented using a computer system similar to computer system 900 that has been configured to provide the functionality of those components. For example, a computer system such as computer system 900 may implement one or more servers, each of which hosts multiple virtual machines on behalf of clients, in some embodiments. In the illustrated embodiment, computer system 900 includes one or more processors 910 coupled to a system memory 920 via an input/output (I/O) interface 930. Computer system 900 further includes one or more network interfaces 940 coupled to I/O interface 930. In some embodiments, network interfaces 940 may include two or more network interfaces, including, e.g., one configured for communication between a virtualized computing resource hosted on the computer system 900 and its clients, and one configured for communication between a virtualized computing resource and external resources, computing systems, data centers, or Internet destinations on networks other than the provider network and a client network on whose behalf the virtualized computing resources are hosted.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. Note that, in various embodiments, each of the physical processors 910 may include multiple processor cores and/or implement multiple hardware execution contexts (hardware threads), different ones of which may be provisioned to provide virtual CPUs for respective virtual computing resource instances, as described herein.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In some embodiments, system memory 920 may include one or more custom or standard memory modules (e.g., DIMMs) that provide the underlying physical resources that are provisioned to supply the virtual memory capacity allocated to various virtual machine instances for the benefit of service customers/subscribers. Note that each such physical memory module may include a custom or standard SPD EEPROM, such as those described herein. In the illustrated embodiment, program instructions and data implementing one or more desired functions, such as those methods, techniques, and data described above for providing virtual computing resource instances using physical resources that may include custom, non-standard sized memory modules, are shown stored within system memory 920 as code 925 and data 926. Note that code 925 may include memory reference code (e.g., a custom or standard MRC) that is used to configure one or more custom or standard memory modules, as described herein.

In one embodiment, I/O interface 930 may be configured to coordinate I/O traffic between processor 910, system memory 920, and any peripheral devices in the device, including any of network interface(s) 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface(s) 940 may be configured to allow data to be exchanged between computer system 900 and other devices 960 attached to a network or networks 950, such as other computer systems or devices as illustrated in the figures, for example. In various embodiments, network interface(s) 940 may support communication via any suitable wired or wireless general data networks, such as types of Ethernet network, for example. Additionally, network interface(s) 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for implementing various embodiments of the techniques for providing virtual computing resource instances using physical resources that may include custom, non-standard sized memory modules described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 900 via I/O interface 930. A non-transitory computer-accessible (e.g., computer-readable) storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface(s) 940.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing nodes that implement a hardware virtualization service on behalf of one or more service clients, each of the computing nodes comprising at least one physical processor and a plurality of physical memory modules having a total memory size; and
a plurality of virtualized computing resource instances available to the one or more service clients, each hosted on a respective one of the computing nodes and comprising one or more virtual processors and virtualized memory;
wherein the plurality of virtualized computing resource instances available to the one or more service clients comprises one or more instances of each of a plurality of different virtualized computing resource instance types;
wherein the amount of virtualized memory in each virtualized computing resource instance is dependent on a respective ratio between the number of virtual processors and the amount of memory that is defined for its virtualized computing resource instance type;
wherein, for at least one of the virtualized computing resource instances, the virtualized memory in the at least one virtualized computing resource instance is implemented by a plurality of integrated circuit memory devices on at least one of the physical memory modules of the computing node on which it is hosted;
wherein, for the at least one physical memory module of the computing node that hosts the at least one virtualized computing resource instance, the plurality of integrated circuit memory devices on the at least one physical memory module comprises integrated circuit memory devices of different densities;
wherein the at least one physical memory module comprising the integrated circuit memory devices of different densities reduces the likelihood of stranding physical memory while implementing the virtualized memory in the at least one virtualized computing resource instance; and
wherein the hardware virtualization service is configured to:
provide a finer granularity for the amount of virtualized memory of the at least one virtual computing resource instance than another virtual computing resource instance whose virtualized memory is implemented by one or more physical memory modules comprising integrated circuit memory devices of a same density.

2. The system of claim 1,
wherein the hardware virtualization service is configured to support multi-tenancy; and
wherein the hardware virtualization service provides virtualized computing resource instances for lease by service clients.

3. The system of claim 1,
wherein the hardware virtualization service provides virtualized computing resource instances for lease by service clients; and
wherein, for one or more of the virtualized computing resource instances, including the at least one of the virtualized computing resource instances, all of the processor capacity of the physical processors that implement the virtual processors and all of the memory capacity of the one or more physical memory modules that are used in the implementation of the virtualized memory are available for lease by service clients within the virtualized computing resource instances at the ratios defined for their types.

4. The system of claim 1, wherein each of the computing nodes hosts virtualized resource instances of a single virtualized computing resource instance type.

5. The system of claim 1, wherein at least one of the computing nodes hosts virtualized resource instances of two or more different virtualized computing resource instance types.

6. A method, comprising:
performing, by one or more computers:
provisioning physical resources of the one or more computers to create a plurality of virtual computing resource instances that are hosted on a computing node comprising the one or more computers for the benefit of one or more clients, wherein the computing node further comprises one or more physical memory modules, implemented by a plurality of integrated circuit memory devices on the one or more physical memory modules, comprising a total memory;

wherein, for each of the plurality of virtual computing resource instances, said provisioning comprises:
provisioning one or more processor cores or hardware execution contexts thereof as virtual processors of the virtual computing resource instance; and
configuring one or more of the physical memory modules to provide virtualized memory for the virtual computing resource instance, wherein the amount of virtualized memory provided for the virtual computing resource instance is dependent on a predetermined ratio between processor capacity and memory capacity;

wherein, for at least one of the one or more physical memory modules configured to provide virtualized memory for at least one of the plurality of virtual computing resource instances, the plurality of integrated circuit memory devices on the at least one physical memory module comprises integrated circuit memory devices of different densities; and wherein the at least one physical memory module comprising the integrated circuit memory devices of different densities reduces the likelihood of stranding physical memory while implementing the virtualized memory in the at least one virtualized computing resource instance; and providing a finer granularity for the amount of virtualized memory of the at least one virtualized computing resource instance than another virtualized computing resource instance whose virtualized memory is implemented by a different at least one physical memory module comprising integrated circuit memory devices of a same density.

7. The method of claim 6,
wherein, for at least two of the plurality of virtual computing resource instances, said provisioning comprises provisioning physical resources to provide different processor capacities or different memory capacities for each of the virtual computing resource instances.

8. The method of claim 6,
wherein the plurality of virtual computing resource instances are available to the one or more clients;
wherein the plurality of virtual computing resource instances available to the one or more clients comprises one or more instances of each of a plurality of different virtual computing resource instance types; and
wherein the predetermined ratio between processor capacity and memory capacity is different for at least two of the plurality of different virtual computing resource instance types.

9. The method of claim 8,
wherein the method further comprises determining, prior to said provisioning, the plurality of different virtual computing resource instance types for which physical resources are to be provisioned or the number of virtual computing resource instances of each of the plurality of different virtual computing resource instance types for which physical resources are to be provisioned; and
wherein said determining is dependent on data representing a history of virtual computing resource instance requests or usage, or on a prediction of future virtual computing resource instance demand.

10. The method of claim 6,
wherein the amount of memory on the physical memory module is x gigabytes, where x is a positive integer and not a power of two.

11. The method of claim 6, further comprising:
receiving, from a given client, a request for a virtual computing resource instance, wherein the request specifies a virtual computing resource instance type and a processor capacity; and
assigning to the given client, in response to said receiving, use of a particular one of the plurality of virtual computing resource instances.

12. The method of claim 11, wherein the memory capacity of the physical memory module that provides the virtualized memory for the virtual computing resource instance satisfies a predetermined ratio between processor capacity and memory capacity that is defined for virtual computing resource instances of the specified virtual computing resource instance type having the specified processor capacity.

13. The method of claim 11, wherein the memory capacity of the physical memory module that provides the virtualized memory for the virtual computing resource instance is a physical memory module among available physical memory modules of the plurality of physical resources that most closely matches a memory capacity that satisfies a predetermined ratio between processor capacity and memory capacity that is defined for virtual computing resource instances of the specified virtual computing resource instance type having the specified processor capacity.

14. The method of claim 11, wherein the combined memory capacity of two physical memory modules that provide the virtualized memory for the virtual computing resource instance satisfies a predetermined ratio between processor capacity and memory capacity that is defined for virtual computing resource instances of the specified virtual computing resource instance type having the specified processor capacity.

15. A system, comprising:
one or more computing devices, at least one of which implements a server, wherein the server comprises one or more physical memory modules; and
a virtual computing service, implemented by the one or more computing devices;
wherein the server is configured to host a virtual resource instance on behalf of a subscriber or customer of the virtual computing service;
wherein the virtual resource instance comprises:
one or more virtual processors, each implemented by a processor core or hardware execution context of a physical processor; and
virtualized memory implemented by a plurality of integrated circuit memory devices on one or more of the physical memory modules;
wherein the amount of virtualized memory is dependent on a predetermined ratio between virtual processor capacity and virtualized memory capacity;
wherein, for at least one physical memory module of the one or more physical memory modules that implement the virtualized memory of the virtual resource instance, the plurality of integrated circuit memory devices on the at least one physical memory module comprises integrated circuit memory devices of different densities;

wherein the at least one physical memory module comprising the integrated circuit memory devices of different densities reduces the likelihood of stranding physical memory while implementing the virtualized memory in the virtual resource instance; and wherein the virtual computing service is configured to:
provide a finer granularity for the amount of virtualized memory of the virtual resource instance than another virtual resource instance whose virtualized memory is implemented by a different at least one physical memory module comprising integrated circuit memory devices of a same density.

16. The system of claim 15,
wherein the amount of memory provided by the integrated circuit memory devices on at least one of the one or more physical memory modules is 10 gigabytes (GB), 12 GB, 14 GB, 20 GB, 24 GB, or 36 GB.

17. The system of claim 15,
wherein the physical processor includes multiple memory channels over which it communicates with the one or more physical memory modules; and
wherein the amount of memory accessed over each of the multiple memory channels is the same.

18. The system of claim 15,
wherein the amount of memory provided by the integrated circuit memory devices on at least one of the one or more physical memory modules is x gigabytes, where x is a positive integer and not a power of two.

19. The system of claim 15,
wherein the amount of memory provided by the integrated circuit memory devices on at least one of the one or more physical memory modules is x terabytes, where x is a positive integer and not a power of two.

20. The system of claim 15,
wherein another one of the computing devices implements another server;
wherein the other server is configured to host another virtual resource instance;
wherein the other virtual resource instance comprises:
one or more virtual processors, each implemented by a processor core or hardware execution context of a physical processor; and
virtualized memory implemented by a plurality of integrated circuit memory devices on one or more physical memory modules; and
wherein the capacity of the one or more virtual processors of the other virtual resource instance or the amount of virtualized memory of the other virtual resource instance is different than that of the virtual resource instance.

* * * * *